Oct. 3, 1961 W. A. GEYGER 3,003,104
DYNAMIC ELECTRICAL CHARACTERISTIC TRACER
Filed Sept. 30, 1957 11 Sheets-Sheet 1

INVENTOR.
W. A. GEYGER
BY
ATTYS.

INVENTOR.
W. A. GEYGER

Oct. 3, 1961 W. A. GEYGER 3,003,104
DYNAMIC ELECTRICAL CHARACTERISTIC TRACER
Filed Sept. 30, 1957 11 Sheets-Sheet 8

INVENTOR.
W. A. GEYGER
BY
ATTYS.

Oct. 3, 1961  W. A. GEYGER  3,003,104
DYNAMIC ELECTRICAL CHARACTERISTIC TRACER
Filed Sept. 30, 1957  11 Sheets-Sheet 11

INVENTOR.
W. A. GEYGER
BY
ATTYS.

United States Patent Office
3,003,104
Patented Oct. 3, 1961

3,003,104
DYNAMIC ELECTRICAL CHARACTERISTIC TRACER
William A. Geyger, 8510 Flower Ave.,
Takoma Park, Md.
Filed Sept. 30, 1957, Ser. No. 687,312
44 Claims. (Cl. 324—34)
(Granted under Title 35, U.S. Code (1952), sec. 266)

The invention described herein may be manufactured and used by or for the Government of the United States of America for governmental purposes without the payment of any royalties thereon or therefor.

This invention relates to testing arrangements for the measurement and determination of the electrical characteristics of alternating-current circuits, and more particularly pertains to the utilization of synchronously operated phase-sensitive arrangements for point-by-point tracing and automatic ink-recording of symmetrical waveforms, dynamic B-H loops, and other alternating-current characteristics at low and high frequencies, up to 20,000 c.p.s. Specifically, the invention is directed to the novel combination of synchronously operated semiconductor-rectifier chopper circuits [preferably with silicon-junction diodes] acting as half-wave or full-wave phase-sensitive rectifier circuits in conjunction with a phase-variable square-wave generator acting as a synchronous switch for the chopper circuits by supplying thereto alternating square-wave reference currents of varying time occurrence relative to a constantly phased sampling signal of a magnetic specimen, the chopper circuits being operable in response to the reference currents and the sampling signal to develop unidirectional currents which are proportional to the instantaneous phase displacements therebetween and which are representative of the waveform of the sampling signal.

Due to the enormous advances during recent years in the fields of magnetic amplifiers, high power contact converters with commutating reactors, and other saturable-reactor devices, the determination of the properties of magnetic core materials for specific applications in these fields has become a necessity. Since the performance of a magnetic medium depends to a large degree on the B-H curve of the medium under the operating conditions encountered in the apparatus in which it is used, the measurement of dynamic hysteresis loops must be counted as of paramount importance. The general purpose of this invention is to provide highly accurate and inexpensive circuits having specific application in the measuring and recording of B-H characteristics, in addition to other analogous applications.

Since the dynamic hysteresis loop represents the instantaneous values of magnetic-flux density B as a function of the associated instantaneous values of magnetic-field intensity H, the basic problem consists in measuring these instantaneous values and their relationship $B = f[H]$. Another possibility consists in measuring the time functions of H, B, and $db/dt$.

The conventional method of displaying dynamic B-H loops as Lissajous figures on a cathode-ray oscilloscope is undesirable since it requires photographic recording for a permanent record. In order to produce an immediate, direct, and permanent record, not requiring subsequent photographic processing, automatic ink-recording of dynamic B-H loops by high-speed $x$—$y$ recorder has been heretofore proposed by employing the combination of a phase-sensitive mechanical rectifier with phase shifter, and moving-coil lightspot galvanometer or mirror-type $x$—$y$ recorder. In this prior art arrangement, an electro-magnetically driven vibrating-reed rectifier is used for measuring the instantaneous values of H and B.

An advance in the art has resulted in the proposal of replacing the vibrating-reed rectifier with a high-precision contact device which is driven by a small synchronous motor. The actual phase angle at which rectification starts, i.e., the point at which the contacts open or close, can be adjusted by varying the angular position of the contacts with regard to the shaft of the motor, in a similar way as in Joubert-disc devices. This motor-operated phase-sensitive rectifier is the basic element of the AEG Vectormeter which may be used for the measurement of dynamic B-H loops and similar applications. Also, an electronic B-H loop tracer employing a large number of vacuum tubes in a rather complex and expensive arrangement has recently become available.

The use of mechanical types of phase-sensitive rectifiers is, of course, restricted to low frequencies [50 to 60 c.p.s.] where a synchronously driven mechanical switch can be operated with regard to the severe requirements on switching performance. The electronic tracer has an upper frequency limit of 10,000 c.p.s. and is too expensive and complex in operation.

The present invention contemplates the provision of novel forms of a high-precision B-H looptracer in which these serious limitations have been removed by employing silicon-junction diode chopper circuits as phase-sensitive rectifier circuits. These phase-sensitive rectifier circuits are synchronously operated from a saturable reactor acting as a magnetic switch. This technique may be applied in a general way for point-by-point tracing and automatic ink-recording of symmetrical waveforms, dynamic B-H loops, and other alternating-current characteristics at low and high frequencies, up to about 20,000 c.p.s.

Herein described are the basic principle, theory of operation, and design of simple and inexpensive dynamic B-H loop tracers which employ no vacuum-tube components. Given herein is detailed information on magnetic-switch-operated silicon-diode, half-wave and full-wave chopper circuits; and presented herein are novel forms of a double-potentiometer bridge circuit which compensates for differences of the silicon-diode characteristics.

In accordance with the invention there is provided a synchronously operated semiconductor-rectifier chopper circuit arrangement acting as half-wave or full-wave phase-sensitive rectifiers for detecting the phase displacement between a reference current and a signal current from a specimen under test to develop therefrom an unidirectional current proportional to the detected phase displacement. The chopper circuit arrangement utilizes either the half-wave bridge-type chopper circuits with silicon-junction-diode elements or full-wave ring-modulator chopper circuits with silicon-junction-diode elements. These silicon-diode chopper circuits are conductively operated by alternating square-wave reference currents from a phase-variable square-wave generator acting as a switch to render the chopper circuits conductive in the manner determined by the phase variations of the generator.

Preferably, the square-wave generator comprises a saturable reactor circuit operatively associated with phase shifting means to incrementally or continuously vary the time occurrence of the reference currents produced thereby.

With this arrangement, point-by-point plotting of symmetrical waveforms may be obtained by incrementally varying the phasing of the square-wave reference currents by varying the phase shifting means and for each setting thereof noting the reading on a galvanometer connected to receive the unidirectional current produced by the chopper circuit. Since the signal current from the specimen under test is of constant phase, the current readings on the galvanometer are proportional to the phase displacements between the signal current and the phase-varying reference currents and hence are representative of the waveform of the signal current, as will become more apparent from the detailed explanation given hereinafter.

If it is desired to automatically record the signal current waveform without manual manipulation, the invention contemplates the utilization of an ink recorder in lieu of a galvanometer and the employment in the square-wave generator of either a motor-driven phase shifter or an oscillator slightly displaced in frequency from the frequency of the specimen's signal current.

In the preferred form for determining the B-H loop of magnetic core materials, the invention contemplates a pair of chopper circuit channels, each being either of the half-wave or full-wave type, for receiving a current representative of the magnetic-flux density B in one channel and the magnetic-field intensity H in the other channel. Square-wave reference currents are applied to render the channels conductive so as to detect the phase difference between the B representative current and the reference currents and between the H representative current and the reference currents whereupon a pair of unidirectional currents, proportional respectively to the B and H components, are developed.

If a point-by-point plot is desired, a respective galvanometer is connected to receive the unidirectional output current of each channel, and the phase shifter is incrementally varied. The readings of both galvanometers for each setting of the phase shifter are noted and plotted against each other. In this manner, the B-H trace of the magnetic core material under test is plotted.

On the other hand if an automatic recording is desired, an *x—y* ink recorder is connected to receive the output of one chopper channel in its *x* ordinate terminals and the output of the other chopper channel in its *y* ordinate terminals. The square-wave reference currents are continuously shifted in phase relative to the B and H representative currents which are fixed in phase. The continuous phase shifting may be achieved by either a motor-driven phase shifter or an oscillator of a frequency slightly different from the frequency of the B and H representative currents which are of the same frequency. The ink recorder is operative in response to the varying unidirectional output currents from the two chopper channels to trace the B-H loop characteristic.

In other applications, remanence and coercive force may be rapidly measured by employing the aforedescribed dual channel-galvanometer arrangement in which either one or the other channel is adjusted to zero output to provide the desired measurement, as will hereinafter be described in detail. In lieu of silicon-diode chopper circuits, transistor demodulator circuits may be employed in the general organization of the inventive concept. Also, the invention provides drift-compensated silicon-diode bridge circuits which eliminate asymmetry-zero-drift errors caused by dissimilarity of the silicon-diode characteristics.

With the foregoing in mind, it is a primary object of the present invention to provide simple and inexpensive forms of dynamic B-H loop determining apparatuses which are not restricted to low frequencies and permits point-by-point determination of the B-H loop.

Another object is to provide an inexpensive and highly accurate automatic ink-recorder for tracing the B-H characteristics of magnetic materials.

An important object of the invention is to utilize silicon-diode chopper circuits as phase-sensitive demodulators in combination with a variable-phase square-wave generator for supplying to the chopper circuits alternating square-wave reference currents of predeterminedly time varying occurrence whereby the chopper circuits detect the varying phase differences between a sample current and the time varying reference currents to therefrom develop unidirectional currents which are correlative to the instantaneous phase differences and which are reproducible on an indicator.

Another object is to provide a simple and inexpensive test device for readily determining remanence and coercive force to thereby attain rapid grading and matching of magnetic core materials.

A further object is the provision of apparatus for measuring and determining symmetrical waveforms and other electrical characteristics of alternating current circuits.

Still another object is the provision of drift compensated silicon-diode bridge circuits which compensate for dissimilarity of diode characteristics and thereby eliminate asymmetry-zero-drift errors.

Yet another object is to provide a B-H loop tracer which requires no vacuum tube components and which can be built from commercially available standard equipment.

An essential object of the invention is the provision of B-H loop tracers which are characterized by excellent resolution power and an accuracy of 1 to 2%.

A significant object is the provision of inexpensive apparatus with which the dynamic magnetic characteristic of a sample of magnetic core material may be automatically and rapidly recorded.

Another important object of the invention is to utilize a ferroresonant magnetic square-wave generator for supplying reference currents to silicon-diode chopper circuits which are effective to detect the phase differences between a sample current and the reference currents.

An ancillary object is to utilize transistor demodulator circuits in combination with a phase-variable square-wave generator to determine the B-H characteristics of magnetic materials.

Other objects and many of the attendant advantages of this invention will be readily appreciated as the same becomes better understood by reference to the following detailed description when considered in connection with the accompanying drawings in which like reference numerals designate corresponding components throughout the figures thereof and wherein:

FIG. 11A is a 400 c.p.s. dynamic B-H loop of an Orthonol core traced by the point-by-point measurement method, while

Figure 1:
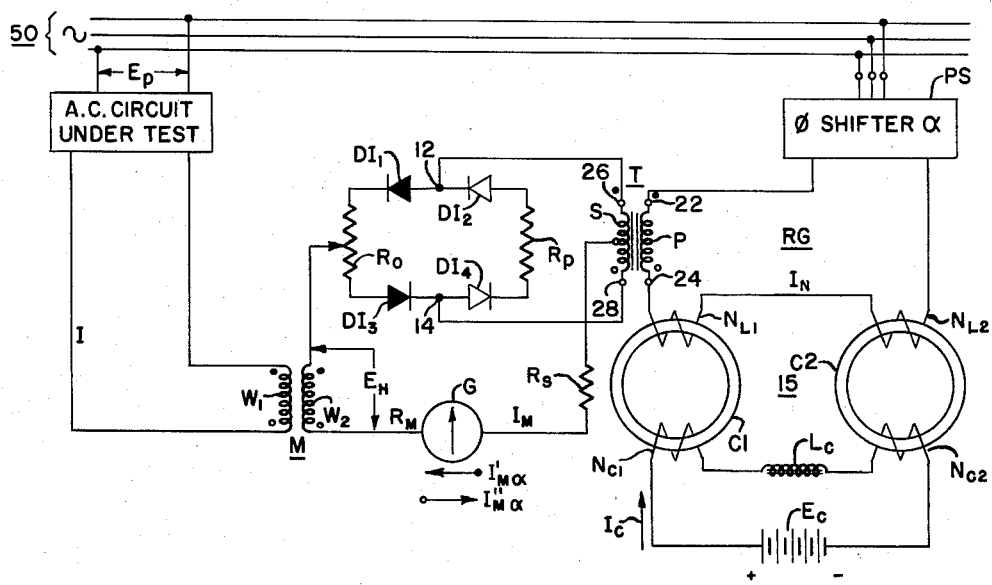
FIG. 1 is a schematic diagram of a magnetic-switch-operated silicon-diode half-wave chopper circuit for point-by-point plotting of current waveforms, in accordance with the invention.

Referring now to the drawings, wherein like reference characters designate like or corresponding parts throughout the several figures, there is shown in FIG. 1 the simplest form of a magnetic-switch-operated silicon-diode chopper circuit for point-by-point tracing of the waveform of an alternating current I having neither a D.C. nor even-harmonic components. Primary winding $W_1$ of an air-core transformer [pure mutual inductance] M carries current I which is derived from the A.C. circuit under test that is energized with a voltage $E_p$ from A.C. power supply 50 of either 60 or 400 c.p.s.

Secondary winding $W_2$ of the air-core transformer M is connected with moving-coil galvanometer G [resistance $R_M$], series resistor $R_S$, and silicon-diode half-wave bridge-type chopper circuit formed with silicon-junction diodes $DI_1$ to $DI_4$ in combination with balance potentiometer resistor $R_O$ and auxiliary resistor $R_P$. The chopper circuit is supplied by current transformer T with alternating square-wave reference current $I_N$ from a variable-phase square-wave generator, indicated generally as RG. The generator RG includes a phase shifter PS, energized from source 50, in combination with a saturable reactor circuit 15 having series-aiding-connected A.C. load windings $N_L$ and series-opposing-connected D.C. control windings $N_o$ energized with a constant voltage from source $E_c$. The equally rated saturable-reactor elements C1 and C2 are preferably of rectangular-hystersis loop core material such as Orthonol. The saturable reactor circuit 15 is operated under "forced magnetization" conditions.

The waveshape of alternating current $I_N$ is nearly rectangular, if the control-circuit loop carrying constant direct current $I_C$ represents a very high impedance [choke coil $L_C$] with regard to even-harmonic currents. The synchronously operated silicon-junction diodes $DI_1$ to $DI_4$ have a comparatively low forward resistance [about 100 to 1,000 ohms] and a very high reverse resistance of about 10 to 100 megohms. They close the secondary circuit of $W_2$ during the time of one half-cycle and open this circuit during the time of the succeeding half-cycle, alternately. That is, actual duration of making and breaking of this switching circuit is exactly equal to $\pi$ or 180 degrees corresponding to the duration of one half-cycle of the power-supply frequency.

In operation of the chopper circuit, when the alternating square-wave reference current $I_N$ is positive at terminal 22 of primary winding P, the chopper circuit is rendered conductive by current flowing from terminal 26 to terminal 12 through diode $DI_1$, resistor $R_O$, diode $DI_3$ through terminal 14 back to terminal 28. During this conductive period, the chopper circuit is effective to pass the current of voltage $E_H$. Under no signal conditions, the bridge of the chopper circuit is balanced and no current flows through galvanometer G. On the other hand, if the current I is present and is of such phase as to be positive at the dark-polarity-end of winding $W_1$ when the chopper is conductive, then this current flows to the tap on resistor $R_O$ and splits into two paths presented by conducting diodes $DI_1$ and $DI_3$, and the two-halves of center-tapped secondary S, the currents converging on the center-tap of S and then flowing through resistor $R_S$ and galvanometer G to indicate the average value $I_{Ma}$ of moving coil current $I_M$. If sample current I is of opposite polarity, the current flow through the chopper circuit follows the same path but is in the opposite direction.

Use of the phase shifter $P_S$ enables the varying of the time interval between the instant of firing of the saturable-reactor elements C1 and C2 and the instant supply voltage $E_P$ of the A.C. circuit under test goes through zero. Thus, it is possible to vary the actual time interval [switching phase angle $\alpha$] between making of the switching circuit and the instant the secondary voltage $E_H$ of the air-core transformer goes through zero.

The method of measuring the time function, i.e., the waveform of current I, consists in tracing the instantaneous values $i_a$ of this current with various phase displacements $\alpha$ between square-wave reference current $I_N$ and supply voltage $E_P$. This method utilizes the fact that, with any phase displacement $\alpha$, the average value $I_{Ma}$ of the unidirectional moving-coil current $I_N$ of galvanometer G is proportional to the instantaneous value $i_a$, provided that current I to be investigated has neither a D.C. nor even-harmonic components.

If series resistor $R_S$ is chosen sufficiently large, so that the galvanometer circuit is essentially resistive and secondary loading of M is negligible, then the instantaneous value of secondary voltage $E_H$ is $$M\frac{di_a}{dt} = i_{Ma} R_{MT} \qquad (1)$$

where $R_{MT}$ is the total resistance of the secondary circuit of M; and $i_a$ is the instantaneous value of primary current I, corresponding to actual switching phase angle $\alpha$. Consequently, the average value of the current corresponding to this phase angle $\alpha$ and indicated by the galvanometer will be $$I_{Ma} = \frac{I}{2\pi}\int_\alpha^{\alpha+\pi} i_{Ma} 2\pi f_D dt = 2f_D \frac{M}{R_{MT}} i_a \qquad (2)$$

where $f_D$ is the frequency of the power supply.

Thus, the variation of $i_a$ with time can be measured and plotted point-by-point by varying the instant at which the chopper circuit conducts and noting the average value $I_{Ma} = f[\alpha]$ indicated by the galvanometer at each setting of the phase shifter. However, the basic principle of this method involves the assumption of a "symmetrical waveform" $[i_a = -i_a + \pi]$. That is, any instantaneous value in the positive lobe has an instantaneous value of equal value but of opposite sign at 180 degrees distance along the time axis.

Figure 1A:
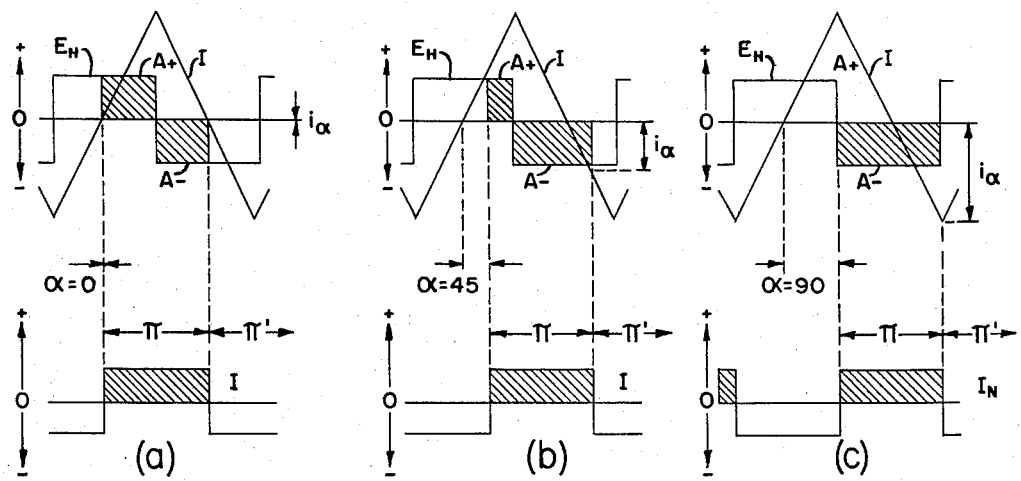
FIG. 1A is a graphic illustration for explanation of the operation of FIG. 1.

FIG. 1A, a simple graphic illustration of the integrating procedure of Equation 2, introduces the assumption that the waveform of primary current I is triangular. Consequently, the waveform of secondary voltage $E_H$, Equation 1, will be rectangular. Since secondary loading of the air-core transformer is assumed to be negligible, the phase displacement between I and $E_H$ is 90 degrees as shown. Phase angle $\alpha$ represents the time interval between the instant of conduction of the chopper circuit [firing of the saturable-reactor elements] and the instant current I goes through zero.

The three diagrams [a], [b], [c] of FIG. 1A correspond respectively to the special cases: $\alpha=0$, $\alpha=45$ degrees, and $\alpha=90$ degrees. Evidently, in any case, the instantaneous value $i_a$ is proportional to the difference between negative area A− and positive area A+; i.e., $i_a = A_- - A_+$. Actually, this difference, i.e., the average value of secondary current $I_{Ma}$, will be indicated by the galvanometer. Therefore, by incrementally varying the phase angle $\alpha$ and noting the galvanometer reading at each setting of the phase shifter, the waveform of current I may be obtained by plotting the galvanometer readings against phase angle $\alpha$.

It is to be noted, however, that Equations 1 and 2 on which the method of FIG. 1 is based, are valid for any symmetrical wave form of current I to be traced. In the example of FIG. 1A, the assumption of triangular waveform of I and rectangular waveform of $E_H$ has been introduced merely to facilitate clear graphic illustration of the effect of the mutual inductance M acting as differentiating means, and of the integrating procedure.

Figure 2:
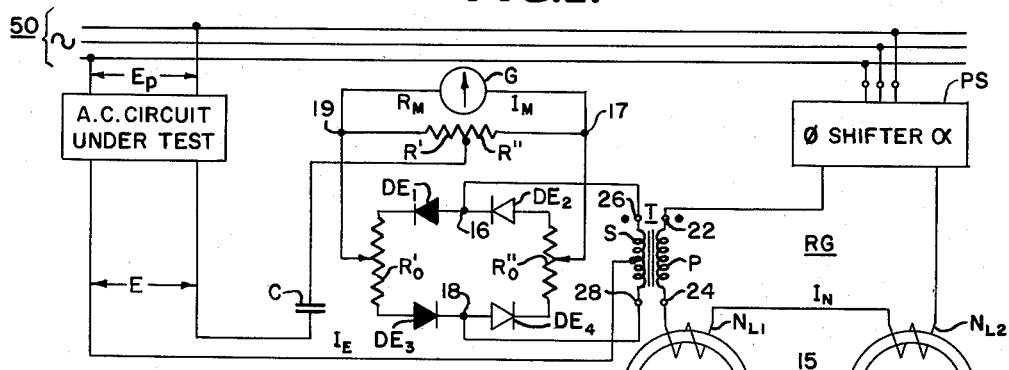
FIG. 2 is a schematic diagram of a magnetic-switch-operated silicon-diode full-wave circuit [ring-modulator acting as a synchronous commutator] for point-by-point tracing of voltage and current waveforms.

When tracing the waveform of an alternating voltage E and referring to FIG. 2, a capacitor C is employed as differentiating means. If $1/[2\pi f_p C]$ is very large compared with the total resistance of the series-connected silicon-junction-diode full-wave circuit [ring-modulator circuit acting as a synchronous commutator and consisting of diodes $DE_1$ to $DE_4$ and resistors $R_O'$ and $R_O''$], then the instantaneous value of capacitive current $I_E$ is $$i_{E\alpha} = C\frac{de_\alpha}{dt} \quad (3)$$

where $i_{E\alpha}$ and $e_\alpha$ are the associated instantaneous values of $I_E$ and E, respectively, corresponding to actual switching phase angle $\alpha$. Consequently, with $R'=R''=R$, the average value of the galvanometer current will be $$I_{M\alpha} = \frac{R}{2R+R_M} \frac{1}{2\pi} \int_\alpha^{\alpha+\pi} i_{E\alpha} = 2f_p \frac{CR}{2R+R_M} e_\alpha \quad (4)$$

where $f_p$ is the frequency of the power supply.

Thus, the variations of $e_\alpha$ with time can be measured point-by-point by varying the instant at which the ring-modulator circuit commutates and noting the average value $I_{m\alpha}=f[\alpha]$ indicated by the galvanometer at each setting $\alpha$ of the phase shifter. However, in this case too, the method is based on the assumption of a symmetrical waveform $[e_\alpha = -e_{\alpha+\pi}]$.

The circuit of FIG. 2 can, of course, also be used for tracing of symmetrical current waveforms. In this case, $E=I\times R_A$ represents the voltage drop across an auxiliary resistor $R_A$ carrying the alternating current I to be investigated.

The operation of the circuit of FIG. 2 is similar to that of FIG. 1 with the exception that the full-wave chopper circuit of FIG. 2 is conductive on each half-cycle of square wave current $I_N$ and that the measured current goes through $R'$ during one half-cycle of current $I_N$ and through $R''$ during the other half-cycle of current $I_N$.

Figure 3:
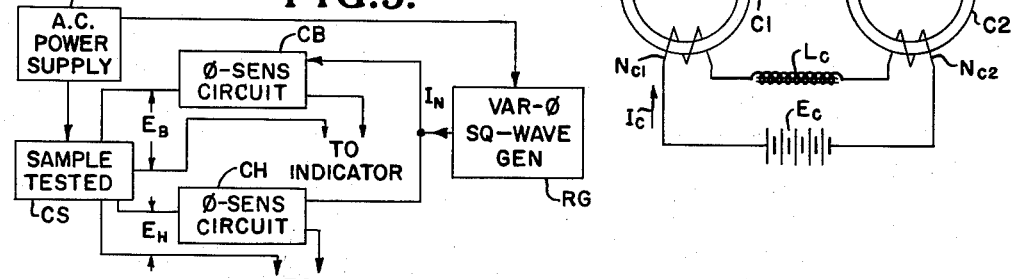
FIG. 3 is a block diagram of the basic inventive concept of the B-H loop determining system in accordance with the present invention.

Referring now to FIG. 3, which is a block diagram showing the basic organization of the system of the present invention for measuring and determining B-H loops of magnetic core materials, an A.C. power supply 50 provides operating potential to the "sample tested" circuit CS and to the variable-phase square-wave generator RG which supplies alternating square-wave reference current $I_N$ to render phase-sensitive circuit CB and CH conductive.

The circuit CS is effective to provide two output voltages $E_B$ and $E_H$ representative, respectively, of the magnetic-flux density B and magnetic-field intensity H of the core material under test. Phase-sensitive channel CB is operable upon conduction thereof to detect the phase difference between the current of $E_B$ and reference current $I_N$ to develop an output unidirectional current $I_B$ which is proportional to the phase difference between the current of $E_B$ and $I_N$. The output current $I_B$ is applied to an indicator such as either a galvanometer or one set of ordinate terminals of an x—y recorder. Likewise, phase-sensitive circuit CH develops an output current $I_H$ which is applied to either a galvanometer or the other set of ordinate terminals of the x—y recorder.

In the point-by-point plotting mode of operation, the phasing of current $I_N$ may be incrementally varied by manually varying a phase shifter in generator RG with the resultant output currents $I_B$ and $I_H$, applied to a respective galvanometer, varying for each setting of the phase shifter, as hereinbefore explained. The galvanometer readings for each phase-shift setting are noted and plotted against each other, the resulting characteristic being the B-H loop of the material tested. If automatic recording is desired, an x—y recorder is connected to the phase-sensitive circuits CB and CH and the phasing of generator RG may be continuously varied by either a motor driven phase shifter or an oscillator which has a frequency slightly different from the frequency of voltages $E_B$ and $E_H$.

Figure 4:
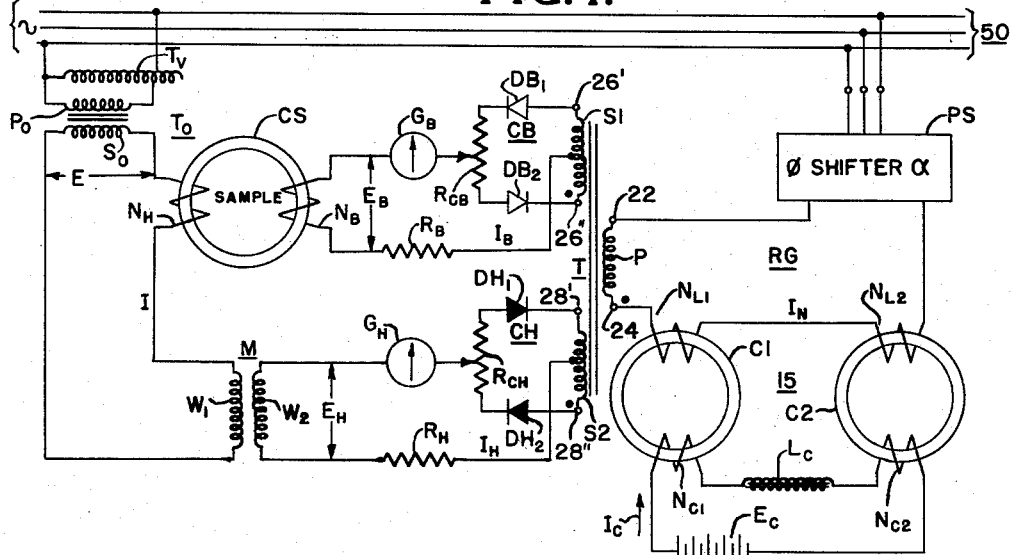
FIG. 4 is a schematic diagram of the simplest form of the B-H loop system of FIG. 3 and employs a pair of silicon-diode half-wave bridge-type chopper circuits.
Figure 8A:
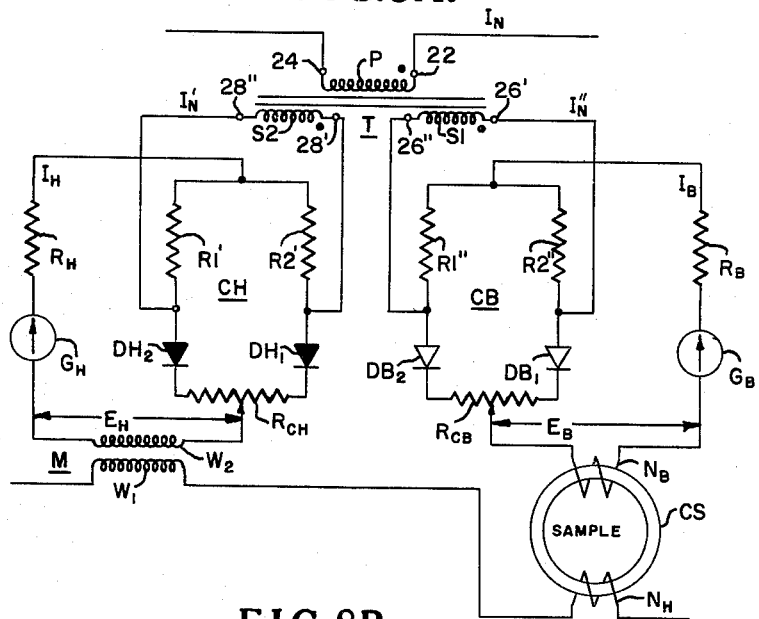
FIGS. 8A and 8B illustrate novel forms, in accordance with the invention, of drift-compensated half-wave bridge circuits and a drift-compensated full-wave ring-modulator circuit, respectively.
Figure 12:
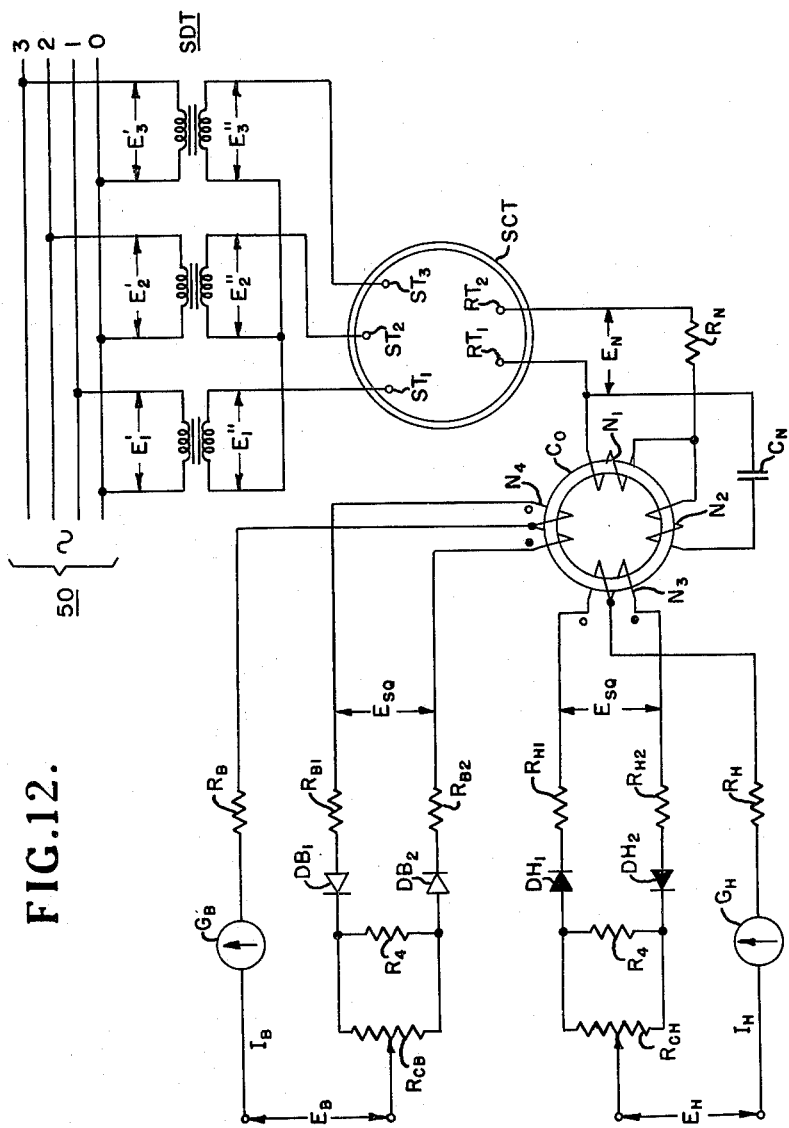
FIG. 12 is a schematic diagram of the preferred embodiment of the invention and utilizes a ferroresonant magnetic switch in combination with a pair of silicon-diode half-wave chopper circuits.

The phase-sensitive circuits CB and CH may be either of the silicon-diode, half-wave, bridge-type chopper circuit as illustrated in FIGS. 4, 8A and 12 or of the silicon-diode full-wave ring modulator type as shown in FIGS. 5, 6, 8B and 13. In lieu of silicon-diode circuits, transistor demodulator circuits may be used as shown in FIG. 14.

The square-wave generator may consist of a saturable reactor circuit operating under "forced magnetization" conditions in combination with either a phase shifter [manually adjustable or motor driven] or an oscillator. Preferably, the generator RG consists of a ferroresonant magnetic circuit in combination with a synchro-control transformer acting as the phase shifter. If desired, any conventional electronic square-wave generator having phase variable means may be employed for generator RG.

Referring now to the various schematic arrangements of FIG. 3 and more particularly referring to FIG. 4, FIG. 4 shows the circuit diagram of the simplest form of the magnetic-switch B-H loop tracer. A sample of the magnetic material under test in the form of a ring core CS without air-gap has a magnetizing primary winding $N_H$ and a secondary winding $N_B$ acting as a search coil which gives an indication of the magnetic-flux changes in the core. Winding $N_H$ with series-connected primary $W_1$ of an air-core transformer [pure mutual inductance] M carry the magnetizing current I which is derived from a three-phase power supply with variable transformer $T_V$ and step-down isolation transformer $T_O$. Secondary windings $W_2$ and $N_B$ are connected with moving-coil galvanometers $G_H$, $G_B$, series resistors $R_H$, $R_B$, and silicon-diode half-wave bridge-type chopper circuits CH, CB with balance potentiometer resistors $R_{CH}$ and $R_{CB}$, respectively. These bridge circuits are supplied from square-wave output current $I_N$ of a magnetic-switch circuit RG, as already shown in FIGS. 1 and 2. The phase shifter PS permits the varying of switching phase angle $\alpha$ between conduction of the chopper circuits and the instant the secondary voltages, $E_H$ and $E_B$, go through zero.

The test circuit of FIG. 4 is based upon the concept of the most commonly used sinusoidal-flux test. It measures the associated instantaneous values $H_\alpha$, $B_\alpha$ of magnetic-field intensity H and magnetic-flux density B, with various phase displacements $\alpha$ between square-wave current $I_N$ and supply voltage $E_P$. This method utilizes the fact that, with any phase displacement between $I_N$ and $E_P$, the average values of the unidirectional moving-coil current $I_H$, $I_B$ of galvanometers $G_H$, $G_B$, are proportional to the instantaneous values of H and B, respectively, provided that the B-H loop is symmetrical. That is, if the wave-shape of magnetizing current I has neither a D.C. nor even-harmonic components. This assumption is valid for magnetic materials which are in cyclical magnetization and have no D.C. component of flux.

If resistors $R_H$, $R_B$ are chosen sufficiently large, so that the galvanometer circuits are essentially resistive, then the following relationships between average values $I_{H_a}$, $I_{B_a}$ and instantaneous values $H_a$ and $B_a$ can be used.

Measurement of $H_a$

The instantaneous value of voltage $E_H$ induced into the secondary winding $W_2$ of the mutual inductance $M$ is $$M\frac{di_a}{dt} = i_{H_a} R_{HT} \tag{5}$$

where $R_{HT}$ is the total resistance of the secondary circuit of $M$, and $i_a$, $i_{H_a}$ are the associated instantaneous values of currents $I$, $I_H$, respectively, corresponding to actual switching phase angle $\alpha$.

Consequently, the average value of the current corresponding to this phase angle $\alpha$ and indicated by galvanometer $G_H$ will be $$I_{H_a} = \frac{1}{2\pi} \int_\alpha^{\alpha+\pi} i_{H_a} 2\pi f_p dt = 2f_p \frac{M}{R_{HT}} i_a \tag{6}$$

where $f_p$ is the frequency of the power supply.

The instantaneous value of magnetic-field intensity corresponding to the switching phase angle $\alpha$ is $$H_a = \frac{0.4\pi N_H i_a}{1_{Fe}} \tag{7}$$

where $1_{Fe}$ is the length of the magnetic path of the core under test. It follows from Equations 6 and 7 that $$I_{H_a} = H_a \frac{f_p M 1_{Fe}}{0.2\pi N_H R_{HT}} \tag{8}$$

Thus, the variation of $H_a$ with time can be measured point-by-point by varying the instant the first chopper circuit conducts and noting the average value $I_{H_a}$=constant $x_{H_a}$ indicated by $G_H$ at each setting $\alpha$ of the phase shifter.

Measurement of $B_a$

The instantaneous value of voltage $E_B$ induced into the secondary winding $N_B$ of the core under test is $$\frac{N_B A_{Fe}}{10^8} \frac{dB_a}{dt} = i_{B_a} R_{BT} \tag{9}$$

where $A_{Fe}$ is the effective cross-sectional area of the core, and $R_{BT}$ is the total resistance of the secondary circuit of $N_B$. $B_a$ represents the instantaneous flux density, and $i_{B_a}$ is the associated instantaneous value of current $I_B$ corresponding to the switching phase angle $\alpha$.

Consequently, the average value of the current corresponding to this phase angle $\alpha$ and indicated by galvanometer $G_B$ will be $$I_{B_a} = \frac{1}{2\pi} \int_\alpha^{\alpha+\pi} i_B 2\pi f_p dt \tag{10}$$

or $$I_{B_a} = \frac{1}{2\pi} \int_\alpha^{\alpha+\pi} \frac{N_B A_{Fe}}{10^8 R_{BT}} \frac{db_a}{dt} 2\pi f_p dt \tag{11}$$

Therefore $$I_{B_a} = B_a \frac{2f_p N_B A_{Fe}}{10^8 R_{BT}} \tag{12}$$

Thus, the variation of $B_a$ with time can be measured point-by-point by varying the instant at which the second chopper circuit conducts and noting the average value $I_{B_a}$=constant $xB_a$ indicated by $G_B$ at each setting $\alpha$ of the phase shifter.

Measurement of coercive force and remanence

When the problem consists merely in determining coercive force and remanence of the core [e.g., for grading and matching of magnetic-amplifier cores], a very simple test procedure may be applied: [1] By operating the phase shifter PS, the average value of $I_B$ can be made zero. Galvanometer $G_H$ will then indicate the coercive force in oersteds. [2] By operating the phase shifter again, the average value of $I_H$ can be made zero. In this case, galvanometer $G_B$ will indicate the remanence in gausses.

Calibration of $G_H$ and $G_B$ may be performed in a convenient way by measuring peak values of sinusoidal standard voltages which are derived from an auxiliary circuit.

Tracing of B-H loops

In order to trace $B_a = f[H_a]$ using the point-by-point method, numerous associated average values of $I_{H_a}$=constant $xH_a$, Equation 8, and $I_{B_a}$=constant $xB_a$, Equation 12, both directly indicated by $G_H$ and $G_B$, can be computed at each setting of the phase shifter. Since the B-H loops are symmetrical, it is practically sufficient to trace only one half of the loop in the range of positive values of $B$.

Figure 5:
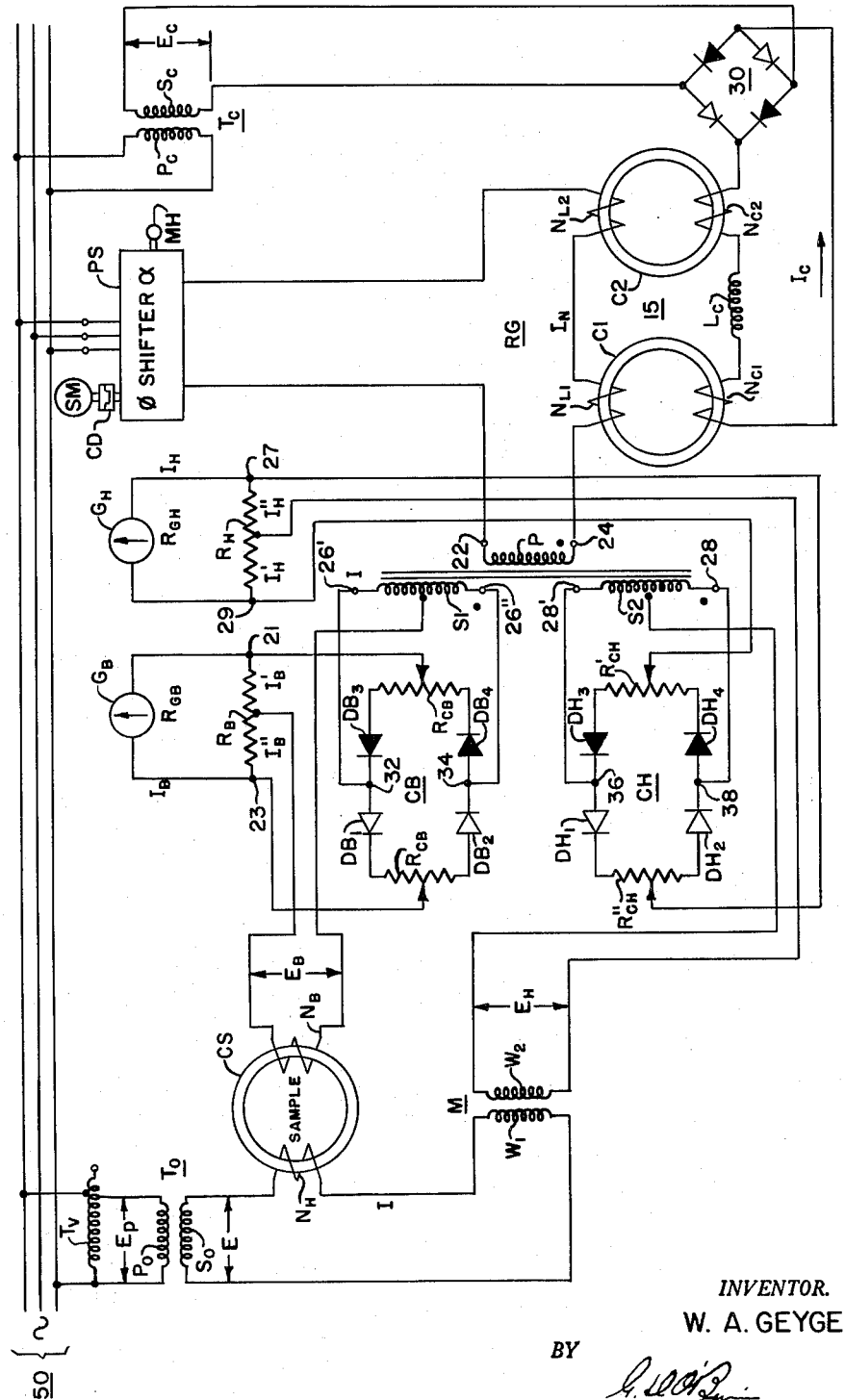
FIG. 5 is a modification of FIG. 4 and utilizes a pair of silicon-diode full-wave ring-modulator circuits acting as synchronous commutators.

FIG. 5 illustrates the modification of replacing the half-wave bridge circuits of FIG. 4 by two full-wave silicon-junction-diode ring-modulator circuits acting as synchronous commutators. In this arrangement, galvanometers $G_H$, $G_B$ are connected across center-tapped resistors $R_H$, $R_B$, and the D.C. circuit of the saturable reactor may be supplied from a step-down transformer $T_C$ with full-wave selenium rectifier 30. The operation and point-by-point plotting method of FIG. 5 are the same as FIG. 4 with the exception that the galvanometers of FIG. 5 register full-wave currents instead of half-wave currents.

In lieu of point-by-point plotting, automatic tracing of the B-H loop by FIG. 5 may be accomplished by using a high-speed x—y ink recorder, such, for example, as the Moseley Autograf. To reproduce $B_a = f[H_a]$ on the chart of the recorder, the rotor of the phase shifter may be moved slowly, preferably through a disengaging clutch by means of a motor SM with speed-reducing gear train. Also, the x and y input terminals of the x—y recorder are connected to terminals 23—21 and 29—27, respectively.

When reproducing B-H loops by x—y plotter, the phase shifter may be replaced by a vacuum-tube oscillator or a switching-transistor D.C. to A.C. converter, the frequency of which is slightly lower or higher than the power-supply frequency $f_p$. For example, with the operating frequencies 60 and 60.04 c.p.s., the ink pen will trace the B-H loop in twenty-five seconds; and with 400 and 400.025 c.p.s., the loop will be traced in forty seconds. This procedure may be termed the "Heterodyne Method" because cycling of the ink pen of the x—y plotter is determined by the actual beat frequency which can be easily controlled by varying the frequency of square-wave current $I_N$ of the magnetic switch. This method relies on the well known fact that as two different frequencies are combined, the phase displacement therebetween gradually increases with each succeeding cycle of each and then gradually decreases in the same manner. The choppers CB and CH are effective to detect these instantaneous phase differences and supply currents correlative thereto to the x—y recorder.

Figure 6:
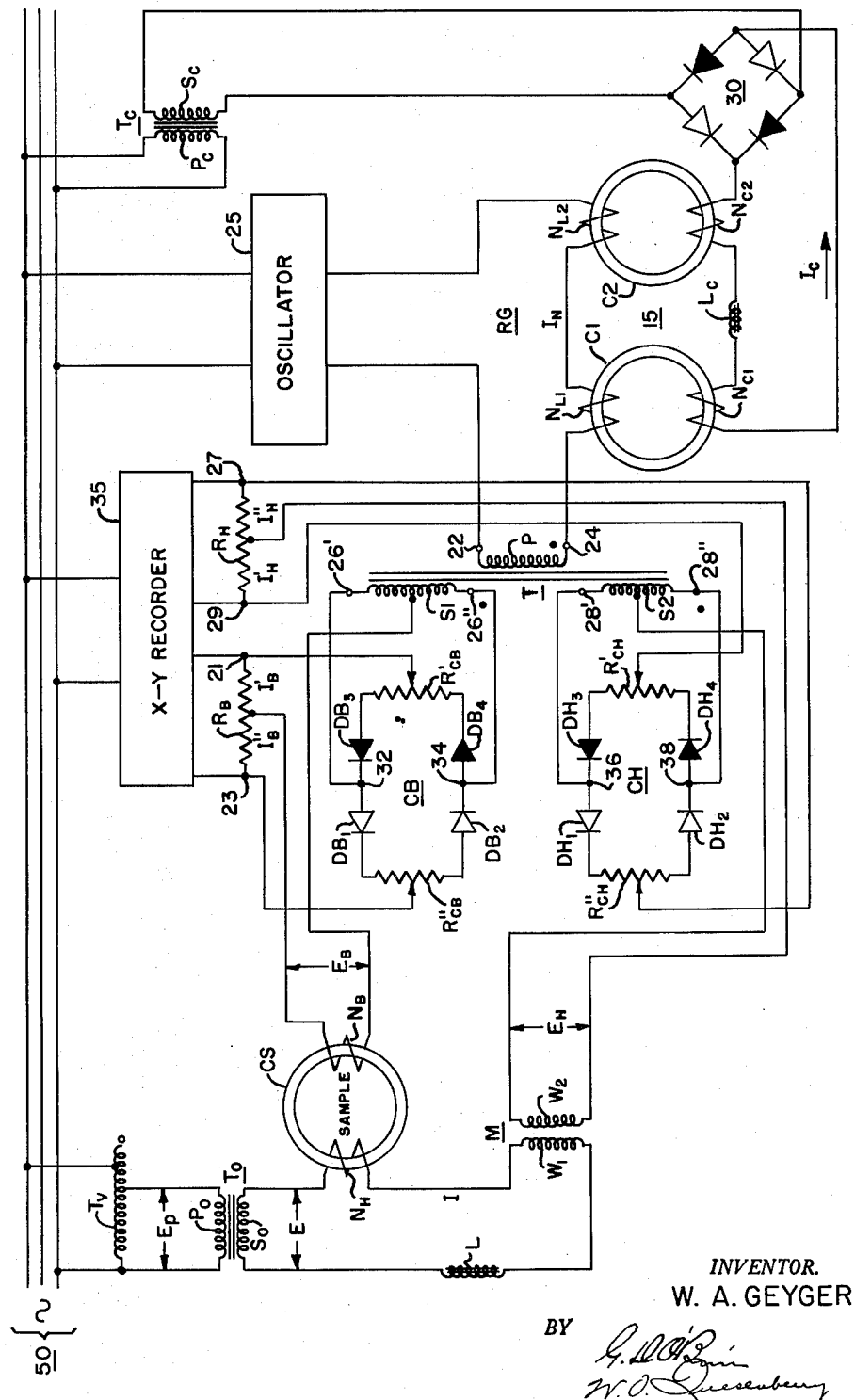
FIG. 6 is a schematic diagram of a B-H loop determining system of the present invention for the automatic ink-recording of dynamic B-H loops by a high speed *x—y* tracer.

FIG. 6, a modification of the arrangement of FIG. 5, illustrates application of the heterodyne method for automatic ink-recording of dynamic B-H loops by high-speed x—y plotter 35. Input channels of this instrument are connected across the center-tapped resistors $R_H$ and $R_B$.

Figure 7:
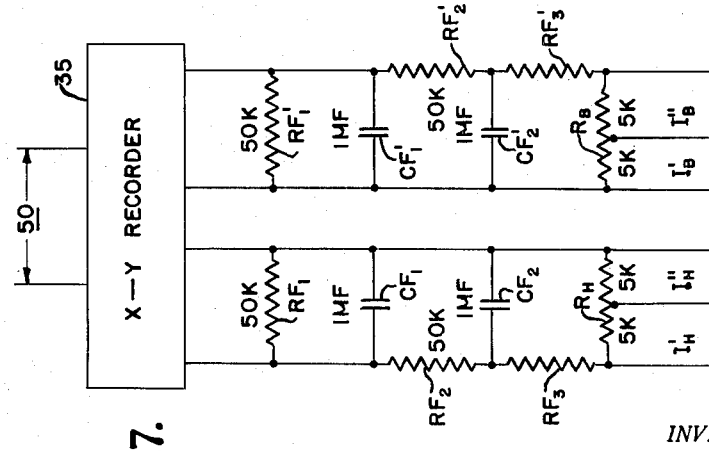
FIG. 7 illustrates filter circuits preferably employed in connection with the circuit of FIG. 6 for eliminating the even-harmonic A.C. components of the unidirectional currents applied to the *x—y* recorder from the chopper circuits.

When employing a galvanometer-type x—y recorder, in which a pair of two-phase induction motors are separately controlled by two moving-coil galvanometers, the input channels of x and y may be directly connected with $R_H$ and $R_B$ as shown in FIG. 6. However, application of a chopper-type x—y recorder makes it necessary to eliminate the double-frequency A.C. components of currents $I_H'$, $I_H''$ and $I_B'$, $I_B''$ by use of the two filter circuits shown in FIG. 7.

The test circuit of FIG. 6 is based upon the concept of the sinusoidal-current test. In this case, primary windings $N_H$, $W_1$, series-connected with a large linear reactor [inductance L], carry the nearly sinusoidal magnetizing current I, and the waveform of magnetic flux in the core will be highly distorted.

*Design considerations*

The requirement that duration of making and breaking of the phase-sensitive rectifiers should be exactly equal to $\pi$ or 180 degrees is of utmost importance. When employing mechanical rectifiers, satisfactory operation will depend on proper adjustment of contact components with regard to actual duration of the switching intervals. However, in the systems of FIGS. 1, 3, and 4 to 6, this basic requirement will always be fulfilled as a result of the fact that duration of each half-cycle of alternating square-wave current $I_N$ is inherently equal to that of the succeeding half-cycle.

Of course, correct operation also involves the assumption that each of the silicon-diode bridge circuits is balanced. That is, the center taps of the secondary windings of current transformer T and the associated sliders of potentiometer resistors $R'_{CB}$ and $R'_{CB}$ must represent equipotential points. After zero adjustment of $I_H$ and $I_B$ with non-signal conditions [$E_H=0$, and $E_B=0$], no error voltage will be injected from these points into the secondary circuits of $W_2$ and $N_B$.

To increase zero stability, actual magnitude of square-wave forward currents of the silicon diodes should be minimized. On the other hand, these reference currents must be sufficiently large compared to the peak values of signal currents $I_H$ and $I_B$ to avoid saturation of the chopper circuits. When employing light-spot galvanometers $G_H$, $G_B$ for testing of very small core samples, very good zero stability [in the order of $10^{-10}$ watt or better at room temperatures] can be achieved by reducing the silicon-diode forward currents, derived from the constant-current source [$I_N$], to about 200 to 800 microamperes.

Figure 8B:
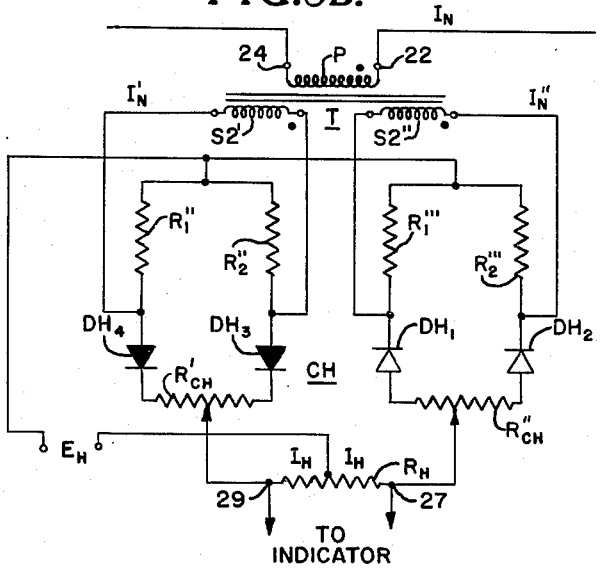

Asymmetry zero-drift errors caused by differences of the silicon-diode characteristics may be practically eliminated by modifying the bridge circuits in the manner shown in FIG. 8. In the arrangement of FIG. 8A with two half-wave bridge circuits, similar to those of FIG. 4, the center taps of current transformer T have been removed, and resistors $R_1'$, $R_2'$ and $R_1''$, $R_2''$ have been added. Similar modification has been applied in designing the full-wave ring-modulator circuit of FIG. 8B which corresponds to the arrangements of FIGS. 5 and 6.

In each half-wave bridge network of FIG. 8, balance can be obtained with no-signal conditions for various values of resistance ratio $R_1/R_2$, by adjusting the sliders of potentiometer $R_{CH}$ and $R_{CB}$, respectively. However, the resistance ratio $R_1/R_2$ and the associated resistance $R_{CH}$ [or $R_{CB}$] can be chosen so that, with no-signal conditions, balance of the bridge network is substantially independent of large changes in magnitude of reference currents $I_N$, $I_N'$ and $I_N''$.

Figure 9:
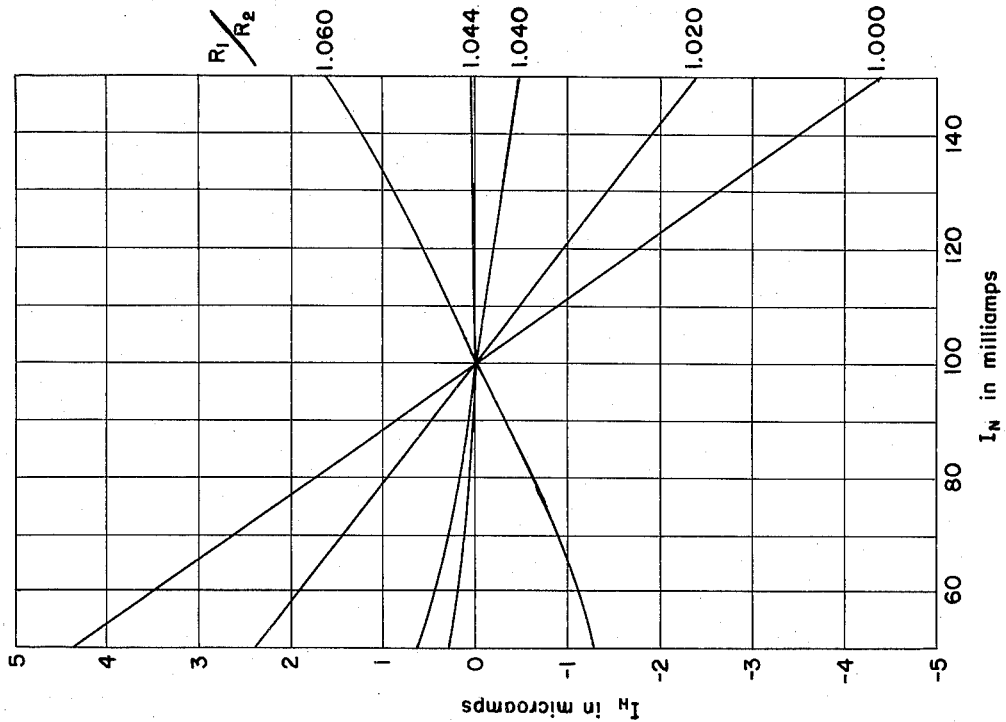
FIG. 9 illustrates the galvanometer current of the circuit of FIG. 8A as a function of the reference current with resistance ratio $R1/R2$ as a parameter.

FIG. 9 shows [for no-signal conditions: $E_H=0$] the galvanometer current $I_H$ of the circuit of FIG. 8A as a function of reference current $I_N$ with resistance ratio $R_1/R_2$ as a parameter. In this typical example, with $R_1=102.2$ ohms, $R_2=97.8$ ohms, $R_1/R_2=1.044$, actual galvanometer current $I_H$ produced by very large changes of $I_N$ has been reduced to about $\frac{1}{30}$ of its original value. Since $I_N$ varies only within the range of about $\pm 1$ to 2 percent, asymmetry zero-drift errors are almost eliminated, and very small magnetic cores can be tested without difficulties.

*Core and winding data*

Magnetic-switch B-H loop tracers of the present invention can easily be built by using commercially available standard components. Tables I and II give core and winding data for saturable reactors and current transformer T, both for the power-supply frequencies 60 c.p.s. and 400 c.p.s.

TABLE I.—SATURABLE-REACTOR DATA

|  |  | Supply freq. 60 c.p.s. | Supply freq. 400 c.p.s. |
|---|---|---|---|
| Core | Material | ½×0.002 Orthonol tape | ¼×0.002 Orthonal tape. |
|  | Size (in.) | 1¼ I.D. | 1⅛ ID. |
|  |  | 1⅝ O.D. | 1⅜ OD. |
| Winding $N_L$ | Wire size | No. 29 (B. and S.) | No. 28 (B. and S.). |
|  | Turns | 1400 | 700. |
|  | Res | 26 ohms | 6 ohms. |
| Winding $N_C$ | Wire size | No. 29 (B. and S.) | No. 28 (B. and S.). |
|  | Turns | 1400 | 350. |
|  | Res | 26 ohms | 4 ohms. |

TABLE II.—TRANSFORMER DATA

|  |  | Supply freq. 60 c.p.s. | Supply freq. 400 c.p.s. |
|---|---|---|---|
| Core | Material | ½×0.002 Supermalloy tape | ¼×0.002 Supermalloy tape. |
|  | Size | 1¼ ID | 1⅛ ID. |
|  |  | 1⅝ OD | 1⅜ OD. |
| Primary | Wire size | No. 32 (B. and S.) | No. 28 (B. and S.). |
|  | Turns | 48 | 24. |
|  | Res | 0.8 ohms | 0.1 ohm. |
| Secondary | Wire size | No. 32 | No. 28. |
|  | Turns | 4×1,000 | 4×500. |
|  | Res | 4×35 ohms | 4×8 ohms. |

Other pertinent data of the half-wave test circuit of FIG. 4 were as follows:

Silicon junction diodes: Texas Instrument Co., No. 606
Galvanometers: 3½ in. panel-type, center-zero scale, −25 . . . 0 . . . +25 microamperes, internal resistance, about 1,200 ohms; or fast-response lightspot galvanometers, 0 . . . 5 microamperes, with universal-shunt potentiometer resistors and reversing switches, internal resistance, about 100 ohms.
Series resistors: $R_H$ and $R_B$, about 1,000 to 10,000 ohms.
Air-core transformer: Mutual inductance M, about 100 to 500 microhenries.
Average value of constant control current: $I_C=200$ milliamperes.
Average value of constant square-wave reference current:

$$I_N = I_C N_C / N_L = 100 \text{ milliamperes}$$

Average value of half-wave forward current in each diode with no-signal conditions: 1,200 microamperes (FIG. 4) or 600 microamperes (FIGS. 5 and 6).

The validity of Equations 5 to 12 is based on the assumption that actual loading of secondary windings $W_2$ and $N_B$ by the galvanometer circuits (total resistances $R_{HT}$ and $R_{BT}$) has no appreciable effect on the indications of $G_H$ and $G_B$. When testing large-size cores employing panel-type microammeters, the power values $E_H^2/R_{HT}$ and $E_B^2/R_{BT}$ may be in the order of 0.1 to 1 microwatt without causing excessive loading of $W_2$ and $N_B$. However, for testing of very small cores, these power values may be reduced to about $10^{-8}$ watts or less by using lightspot galvanometers. Of course, in any case, a single galvanometer in connection with a selecting switch may be used for alternate measurement of $E_H$ and $E_B$.

Numerous nickel-iron-alloy cores of various sizes have been tested with the devices of the present invention by the point-by-point method to demonstrate the universal range of application and the high performance of this very simple and inexpensive technique.

Test windings having only a few turns (for example, $N_H=5$, $N_B=4$) are applied to the core sample by means of a miniature-type 9-pin plug connector. Thus, the device meets the extremely important requirement that routine testing can be achieved before wire windings are placed on the cores.

Figure 10A:
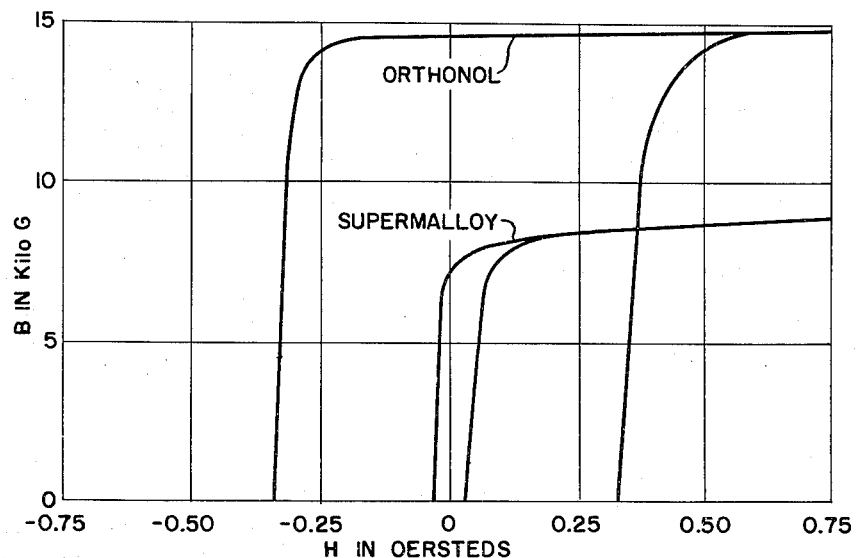
FIGS. 10A and 10B are 60 c.p.s. dynamic hysteresis loops of an Orthonol tape core and a Supermalloy tape core, respectively, traced by the apparatus of the present invention.

FIGURE 10 presents, for sinusoidal-flux (A) and sinusoidal-current (B) excitation conditions, the 60-c.p.s. B-H loops of an Orthonol 2-mil tape core and a Super-malloy 2-mil tape core, both cores having exactly the same dimensions (I.D.=1¼ in., O.D.=1⅝ in., tape width =½ in.). Thus, the point-by-point measurements have been made under almost identical conditions with regard to the dimensions of the core samples; only the core material has been changed to get the net differences between the characteristics of these materials.

Comparison between the dynamic B-H loops of (A) and (B), FIG. 10, illustrate the fact that application of well defined excitation conditions of the core samples is of utmost importance. Therefore, the primary part of the magnetic-core test circuit itself should be carefully designed in such a way that either the magnetic flux B or the magnetizing current I is substantially sinusoidal.

Figure 10B:
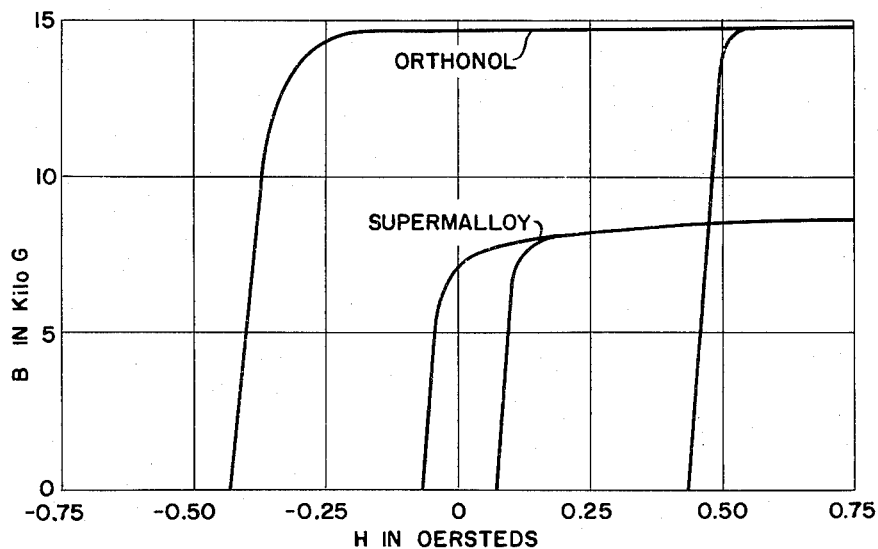
Figure 11A:
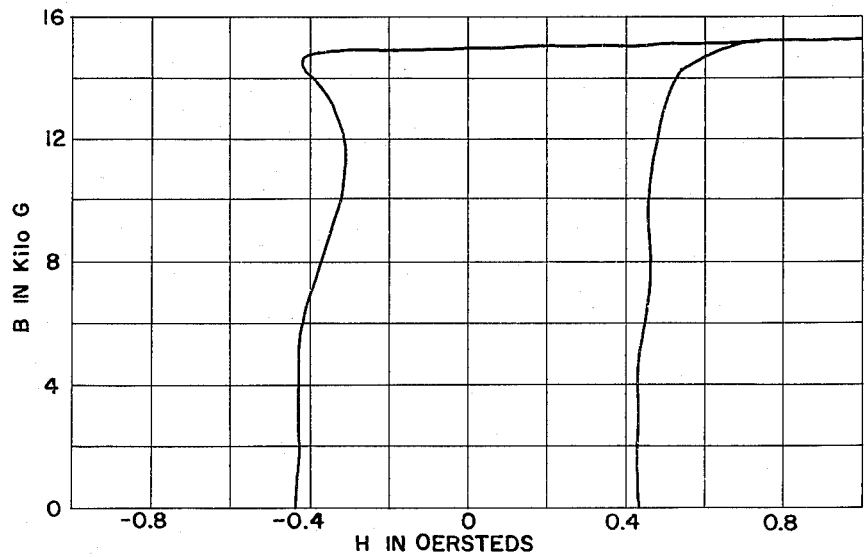
Figure 11B:
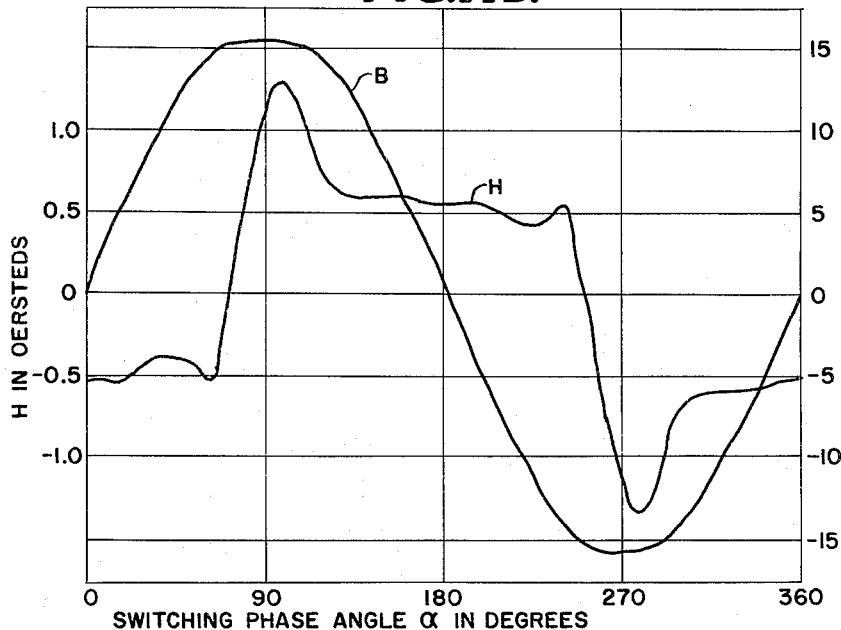
FIG. 11B illustrates the corresponding instantaneous values of magnetic-field intensity H and magnetic-flux density B plotted versus the angular position of the rotor of the phase shifter.

FIGURE 11 shows, for sinusoidal-flux testing conditions, the results of point-by-point measurements with $f_P=400$ c.p.s. on an Orthonol 2-mil tape core (I.D.=1½ in., O.D.=2½ in., tape width=1.0 in.). An interesting detail of the dynamic B-H loop, FIG. 10(A), of this core having comparatively small I.D./O.D. ratio ⅗ is the peak at the beginning of the flux reversal. FIGURE 10(B) shows the corresponding instantaneous values of H and B plotted versus switching phase angle $\alpha$ (angular position of the rotor of the phase shifter, FIG. 4).

With regard to the various sizes of the magnetic-core samples, it is to be noted that very small cores consisting of only 4 to 10 turns of Orthonol or Super-malloy 2-mil tape, ⅛ in. wide, mean core diameter about 0.3 to 0.5 in., have been tested with $N_H=100$ and $N_B=25$. On the other hand, very large cores have been investigated employing a high-resistance voltage divider across the single-turn secondary ($N_B=1$) of the sample to reduce $E_B$ to r.m.s. values in the order of 50 millivolts.

The diagrams of FIGS. 10 and 11 make it evident that the resolution power of the magnetic-switch B-H loop tracer is excellent. After proper calibration by measuring peak values of sinusoidal standard voltages, derived from an auxiliary circuit, an over-all accuracy of ±1 to 2 percent can be expected. With higher power-supply frequencies (up to about 20,000 c.p.s.), the conventional artifices for eliminating disturbing effects of capacitive currents and magnetic stray fields (e.g., application of magnetic shields, electrostatic shielding of transformer windings, proper grounding connections, etc.) must be employed to secure this accuracy of measurements.

In order to check correct operation of the system, the magnetic-core sample may be replaced by an air-core transformer. In this case, two pure mutual inductances are compared with each other, and the result of the point-by-point tracing or $x-y$ plotter recording will be a straight line through the zero point of the co-ordinate system. The B-H circuit tracers of the present invention, for simplicity, may be referred to as the Ferrotracer.

The basic principle of the Ferrotracer, as shown in the circuit diagrams consists in applying magnetic-switch-operated chopper circuits without vacuum-tube components for point-by-point tracing and automatic ink recording of dynamic B-H loops at low and high frequencies (up to about 20,000 c.p.s.). Obviously, the components of this system may be modified and applied in various ways, as illustrated in the following sections.

The silicon-diode chopper circuits may be supplied from another type of magnetic switch producing constant square-wave reference currents. Various forms of series- or parallel-type ferroresonant circuits consisting of a non-linear reactor with almost rectangular magnetic characteristic, a capacitor, and a linear reactor or resistor may be used equally well as a simple synchronous square-wave generator in conjunction with the Ferrotracer.

FIGURE 12 shows a considerably simplified magnetic-switch circuit using half-wave chopper circuits CB and CH, the power requirements of which are so low (about 0.3 to 0.5 watt) that it may be supplied from a small standard-type, 60 c.p.s. or 400 c.p.s., synchro control transformer acting as a miniature-size phase shifter. Three small step-down transformers, indicated as SDT (e.g., $E'_1/E''_1=E'_2/E''_2=E'_3/E''_3=120/50$ volts) are provided to reduce the voltages applied to the stator windings $ST_1$, $ST_2$, $ST_3$ of the synchro control transformer to a proper value.

Table III gives the core and winding data of the saturating reactor with toroidal windings $N_1$ to $N_4$ and the dimensions of capacitor $C_N$ and series resistor $R_N$, both

TABLE III.—FERRORESONANT DATA

|  |  | Supply frequency, 60 c.p.s. | Supply frequency, 400 c.p.s. |
|---|---|---|---|
| Core C0 | Material | 1.0×0.002 Orthonol tape | ½×0.002 Orthonol tape. |
|  | Size (in.) | 1.0 ID | 1⅛ ID. |
|  |  | 1.5 OD | 1⅜ OD. |
| Winding $N_1$ | Wire size | No. 23 (B.&S.) | No. 23 (B.&S.). |
|  | Turns | 150 | 120. |
|  | Resistance | 0.9 ohm | 0.5 ohm. |
| Winding $N_2$ | Wire size | No. 23 (B.&S.) | No. 23 (B.&S.). |
|  | Turns | 150 | 120. |
|  | Resistance | 0.9 ohms | 0.5 ohm. |
| Winding $N_3$ | Wire size | No. 29 (B.&S.) | No. 29 (B.&S.). |
|  | Turns | 2×75 | 2×45. |
|  | Resistance | 2×1.8 ohms | 2×0.7 ohms. |
| Winding $N_4$ | Wire size | No. 29 (B.&S.) | No. 29 (B.&S.). |
|  | Turns | 2×75 | 2×45. |
|  | Resistance | 2×1.8 ohms | 2×0.7 ohms. |
| Capacitor $C_N$ | Capacitance | 4 μf. | 0.5 μf. |
| Resistor $R_N$ | Resistance | 700 ohms | 700 ohms. |
| Res. $R_{B1}$ | do | 1,000 ohms | 1,000 ohms. |
| Res. $R_{B2}$ | do | do | Do. |
| Res. $R_{CB}$ | do | 500 ohms | 500 ohms. |
| Res. $R_{H1}$ | do | 1,000 ohms | 1,000 ohms. |
| Res. $R_{H2}$ | do | do | Do. |
| Res. $R_{CH}$ | do | 500 ohms | 500 ohms. |
| Res. $R_4$ | do | 10 ohms | 10 ohms. |
| Res. $R_5$ | do | do | Do. | for the power-supply frequencies 60 c.p.s. and 400 c.p.s. Since the parallel-type ferroresonant circuit, incorporating a saturating reactor with rectangular-hysteresis-loop core material, acts as a constant-voltage transformer, it is not necessary to apply drift compensation of the chopper circuits, as shown in FIGS. 8A and 8B. It is possible, in this case, to employ center-tapped secondary windings (e.g., $E'_{SQ}=E''_{SQ}=2\times 4=8$ volts, when using the Texas Instrument 606 silicon diode), and resistance values, as indicated in the circuit diagrams of the chopper circuits, FIG. 12. Two three-turn, 500-ohm potentiometer resistors are provided for zero adjustment of the chopper circuits ($I_H=0$ with $E_H=0$, and $I_B=0$ with $E_B=0$).

With regard to proper operating conditions of the ferroresonant magnetic-switch circuit of FIG. 12, it is to be noted that the magnitude of supply voltage $E_N$ and the resistance of $R_N$ must be chosen so that the circuit produces symmetrical square-wave voltages $E'_{SQ}$ and $E''_{SQ}$. By proper adjustment of the series resistor $R_N$ it is always possible to obtain the basically required symmetrical mode of square-wave operation for a given voltage range (e.g., $E_N=19$ to 21 volts).

In the ferroresonant circuit of FIG. 12, the average value of output voltage is linearly proportional to power-supply frequency. Therefore, it is possible to use such saturating-reactor circuits as a high-precision frequency meter.

Figure 13:
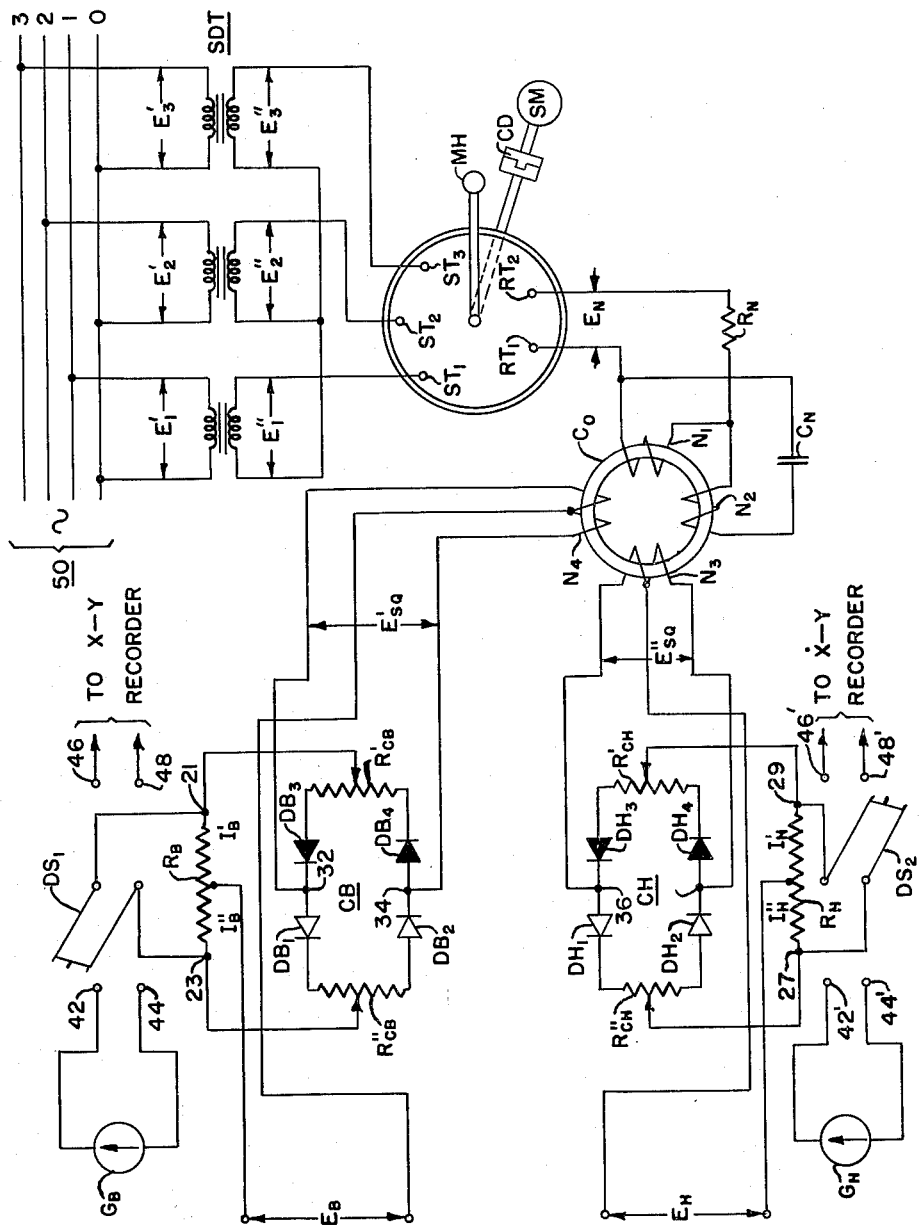
FIG. 13 is a modification of FIG. 12 and utilizes a pair of silicon-diode full-wave ring-modulator circuits.
Figure 14:
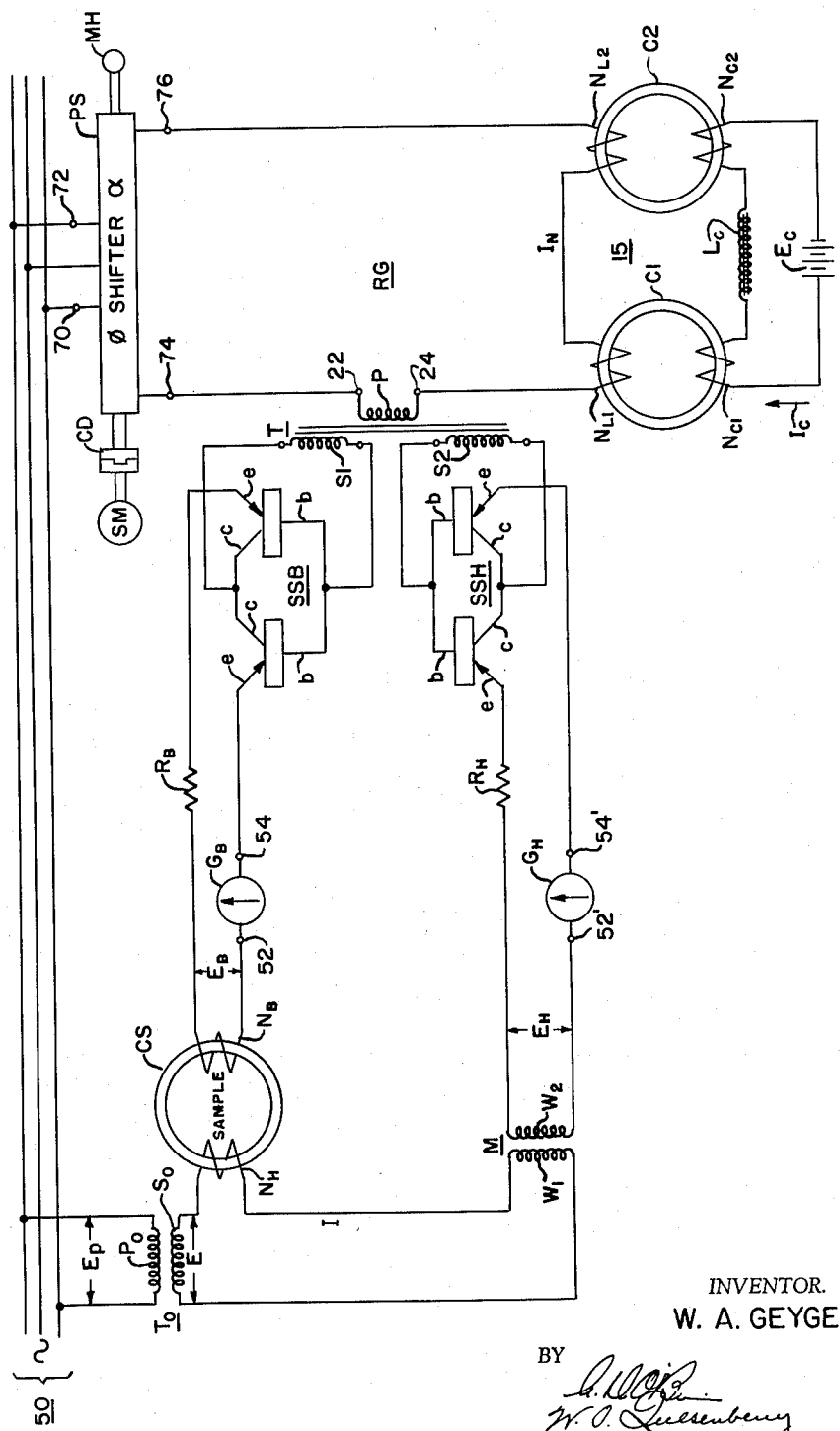
FIG. 14 is a schematic diagram of the invention employing a pair of transistor demodulator circuits as phase-sensitive rectifier circuits.

FIG. 13 is a modification of the ferroresonant circuit of FIG. 12 and employs full-wave ring modulator circuits of the type shown in, and discussed with respect to, FIGS. 5 and 6. In addition, FIG. 13 illustrates the manner in which the circuit may be adapted for use with either galvanometers or an $x$—$y$ recorder by employing double-pole double-throw switches $DS_1$ and $DS_2$ across output resistors $R_B$ and $R_H$ respectively and either manual or motor driven synchro control transformer or an oscillator.

If desired, the phase-sensitive chopper circuits of FIG. 4 may be replaced with transistor demodulator circuits, as shown in FIG. 14 wherein the current of voltage $E_B$ is demodulated by transistor network SSB acting as a switch rendered conductive by half-cycle pulses of one polarity of current $I_N$, while transistor network SSH demodulates the current of $E_H$ on the other polarities of current $I_N$. As in FIG. 4, the phase-shifter is varied as aforedescribed. The action of transistor networks SSB and SSH is similar to that of the chopper circuits in supplying, to the galvanometers $G_B$ and $G_H$, currents which are correlative to the instantaneous phase displacements between the currents of $E_B$, $E_H$ and the phase varying reference current $I_N$. The transistors employed in FIG. 14 are of the PNP type. In lieu of the saturable reactor-phase shifter arrangement illustrated, the embodiment of FIG. 14 may use either an oscillator-reactor arrangement to practice the heterodyne method by omitting phase shifter PS and connecting an oscillator between terminals 70—72 and 74—76; or a ferroresonant circuit, as shown in FIG. 12, may be employed. Alternatively, a motor-driven phase-shifter may be used, as shown. If a motor-driven phase shifter or oscillator is used in the square-wave generator RG, an $x$—$y$ recorder may be substituted for the galvanometers $G_B$ and $G_H$ by connecting one ordinate of the $x$—$y$ recorder to terminals 52—54 and the other ordinate of the recorder to terminals 52'—54' in FIG. 14.

Of course it is to be understood that the circuits of FIGS. 5, 12, 13 and 14 may be used to determine remanence and coercive force in the same manner as hereinbefore described with respect to FIG. 4. It is also to be understood that an $x$—$y$ recorder may be used in any of the half-wave chopper circuit arrangements herein described by employing either a motor-driven phase-shifter or the aforedescribed oscillator arrangement.

From the foregoing, it is apparent that the invention provides simple and inexpensive circuit arrangements for accurately measuring B-H characteristics and symmetrical waveforms and consisting of phase-sensitive detector circuits driven with reference currents from a phase-variable square-wave generator. It is also evident that the basic concept of the invention is versatile in variety of applications and readily adaptable to numerous modifications and variations in circuit arrangement. Moreover, the basic concept of the invention is not limited to a single mode of operation but instead is so flexible in operation as to be capable of practicing several methods in determining any waveform within its range of measurements. As a matter of fact, the apparatus of the present invention is capable of practicing several different methods in determining the B-H characteristic of magnetic core material.

Obviously many modifications and variations of the present invention are possible in the light of the above teachings. It is therefore to be understood that, within the scope of the teachings herein and the appended claims, the invention may be practiced otherwise than as specifically described.

What is claimed as new and desired to be secured by Letters Patent of the United States is:

1. Apparatus for determining the deviation in initiation of occurrences of a cyclically recurring first electrical function from the initiation of occurrences of a cyclically recurring second electrical function produced by an energized electrical sample under test, the initiation of occurrences of said first function being controllably variable while the initiation of occurrences of said second function remain substantially constant, said apparatus comprising, in combination, terminal means for receiving said second function, generating means for producing said cyclically recurring first function, means operatively associated with said generating means for controlling the instant of initiation of each occurrence of said first function, and circuitry conductively combining said first and second functions to produce a third electrical function representative of the instantaneous deviations between the initiations of occurrences of said first and second functions, wherein said second function includes an alternating current component representative of the magnetic-field intensity of a magnetic material serving as the sample under test and magnetizingly energized therewith; wherein said first function comprises alternating square-wave currents of which the instants of initiation are variable under control of said controlling means; and wherein said third function includes unidirectional currents of a magnitude which is a measure of the coercive force of the magnetic material under test.

2. Apparatus for determining the deviation in initiation of occurrences of a cyclically recurring first electrical function from the initiation of occurrences of a cyclically recurring second electrical function produced by an energized electrical sample under test, the initiation of occurrences of said first function being controllably variable while the initiation of occurrences, of said second function remain substantially constant, said apparatus comprising, in combination, terminal means for receiving said second function, generating means for producing said cyclically recurring first function, means operatively associated with said generating means for controlling the instant of initiation of each occurrence of said first function, and circuitry conductively combining said first and second functions to produce a third electrical function representative of the instantaneous deviations between the initiations of occurrences of said first and second functions, wherein said second function includes an alternating current component inductively derived from a magnetizing current applied to a magnetic core material serving as the sample under test, said current component being representative of the magnetic-flux density of said material; wherein said first function comprises alternating square-wave currents of which the instants of initiation are variable under control of said controlling means; and wherein said third function includes unidirectional currents of a magnitude which is a measure of the remanence of the magnetic material under test.

3. Apparatus for determining the deviation in initiation of occurrences of a cyclically recurring first electrical function from the initiation of occurrences of a cyclically recurring second electrical function produced by an energized electrical sample under test, the initiation of occurrences of said first function being controllably variable while the initiation of occurrences of said second function remain substantially constant, said apparatus comprising, in combination, terminal means for receiving said second function, generating means for producing said cyclically recurring first function, means operatively associated with said generating means for controlling the instant of initiation of each occurrence of said first function, and circuitry conductively combining said first and second functions to produce a third electrical function representative of the instantaneous deviations between the initiations of occurrences of said first and second functions, wherein said second function includes a first alternating current applied as a magnetizing current to a magnetic core material serving as the sample under test and a second alternating current inductively derived from the magnetization of said core material, said first and second currents being in constant phase relationship with respect to a reference phase; wherein said first function comprises alternating square-wave currents of which the instants of initiation are variable, relative to said reference phase, under control of said controlling means; wherein said combining circuitry comprises a pair of combining channels, one of said channels being connected to receive said first current and said square-wave currents and operable to derive therefrom unidirectional currents representative of the instantaneous phase differences therebetween, the other of said channels being connected to receive said second current and said square-wave currents and operable to derive therefrom unidirectional currents representative of the instantaneous phase differences therebetween; and wherein said third function is a composite of the unidirectional currents derived by said channels and a representation of the dynamic hysteresis loop of the magnetic core material under test.

4. The apparatus of claim 3, wherein said generating means comprises saturable reactor means having windings thereon energized in such a manner as to produce alternating square-wave currents.

5. The apparatus of claim 4, wherein said controlling means is in operative circuit relationship with said reactor means and operable to shift the instant of initiation of the cycles of said produced square-wave currents.

6. The apparatus of claim 5, wherein each of said channels comprises a semiconductor phase-sensitive circuit.

7. The apparatus of claim 5, wherein each of said channels comprises a half-wave transistor demodulator including two PNP type transistors having their bases connected to a first common terminal and their collectors connected to a second common terminal, said square-wave currents being applied across said first and second common terminals as the operating potential for said two transistors, and input circuit means serially interconnecting the emitters of said two transistors and including terminal means for connection to an indicator; wherein said first alternating current is applied to the input circuit means of the demodulator in said one channel; and wherein said second alternating current is applied to the input circuit means of the demodulator of said other channel; the common terminals of the demodulator of said one channel being so phased with respect to the common terminals of the demodulator of said other channel that the demodulator of said one channel is conductive only during half-cycles of one polarity of said alternating square-wave currents while the demodulator of said other channel is conductive during half-cycles of opposite polarity of said square-wave currents.

8. The apparatus of claim 7, wherein said controlling means is a manually-adjustable phase-shifter for incrementally varying the instant of initiation of the cycles of said square-wave currents.

9. The apparatus of claim 7, wherein said controlling means is a motor-driven phase-shifter which progressively varies the instant of initiation of the cycles of said square-wave currents.

10. The apparatus of claim 7, wherein said first and second alternating currents are of the same frequency; and wherein said controlling means is an oscillator the frequency of whch differs slightly from the first mentioned frequency.

11. The apparatus of claim 5, wherein each of said channels comprises a silicon-diode chopper circuit operating as a phase-sensitive rectifier circuit.

12. The apparatus of claim 11, wherein said saturable reactor means includes control windings serially interconnected through a choke coil so as to operate under forced magnetization conditions.

13. The apparatus of claim 12, wherein each of said chopper circuits is a half-wave bridge-type chopper circuit including a silicon-junction-diode in at least two legs of the bridge; and wherein said controlling means is a manually-adjustable phase-shifter for incrementally varying the instant of initiation of the cycles of said square-wave currents.

14. The apparatus of claim 12, wherein each of said chopper circuits is a full-wave ring-modulator circuit including a silicon-junction-diode in each leg thereof.

15. The apparatus of claim 14, wherein said controlling means is a dual mode phase-shifter selectively operable for manual adjustment in one mode and continuously by a motor in the other mode.

16. The apparatus of claim 14, wherein said first and second alternating currents are of the same frequency; and wherein said controlling means is an oscillator the frequency of which differs slightly from the first mentioned frequency.

17. The apparatus of claim 11, wherein said saturable reactor means is a ferroresonant magnetic switch circuit including a pair of interconnected primary windings and a pair of secondary windings, each of said secondary windings being connected in conductive circuit relationship with a respective one of said chopper circuits; and wherein said controlling means is a synchrocontrol transformer of which the rotor is connected to said primary windings.

18. The apparatus of claim 17, wherein each of said chopper circuits is a half-wave bridge-type chopper circuit including a silicon-junction-diode in at least two legs of the bridge.

19. The apparatus of claim 17, wherein each of said chopper circuits is a full-wave ring-modulator circuit including a silicon-junction-diode in each leg thereof.

20. Apparatus for determining the deviation in initiation of occurrences of a cyclically recurring first electrical function from the initiation of occurrences of a cyclically recurring second electrical function produced by an energized electrical sample under test, the initiation of occurrences of said first function being controllably variable with respect to a cyclically constant reference while the initiation of occurrences of said second function remain fixed relative to said cyclically constant reference: said apparatus comprising, in combination, terminal means for receiving said second function, generating means for producing said cyclically recurring first function, means operatively associated with said generating means for controlling the instant of initiation of each occurrence of said first function with respect to said constant reference, and combining circuitry presenting a common electrical conductive path to said first and second functions to derive therefrom a third electrical function representative of the instantaneous deviations between the initiations of occurrences of said first and second functions.

21. Apparatus for determining the deviation in initiation of occurrences of a cyclically recurring first electrical function from the initiation of occurrences of a cyclically recurring second electrical function produced by an energized electrical sample under test, the initiation of occurrences of said first function being controllably variable with respect to a cyclically constant reference while the initiation of occurrences of said second function remain fixed relative to said cyclically constant reference: said apparatus comprising, in combination, terminal means for receiving said second function, generating means for producing said cyclically recurring first function, means operatively associated with said generating means for controlling the instant of initiation of each occurrence of said first function with respect to said constant reference, and combining circuitry presenting a common electrical conductive path to said first and second functions to derive therefrom a third electrical function representative of the instantaneous deviations between the initiations of occurrences of said first and second functions, wherein said generating means comprises a saturable reactor square-wave generator producing alternating square-wave currents as said first function; wherein said combining circuit comprises silicon-diode chopper circuits electrically conducting said first and second functons and operating as phase-sensitive detectors therefor, wherein said saturable reactor generator is a ferroresonant magnetic switch including a saturable reactor core having thereon secondary windings connected in conductive relation with said chopper circuits and primary windings wound thereon; and wherein said controlling means is a synchro control transformer having the rotor thereof connected to energize said primary windings.

22. The apparatus of claim 21, wherein said chopper circuits are of the half-wave bridge-type.

23. The apparatus of claim 21, wherein said chopper circuits are of the full-wave ring-modulator type.

24. A test device for determining an electrical characteristic of an electrical sample energized from an alternating current source of operating potential to produce a periodically varying composite signal of symmetrical waveform and of fixed phase relative to a reference phase, said test device including, in combination, energizing terminal means for connection to said source, variable-phase square-wave generating means adapted to be energized from said source through said terminal means and operable upon energization therefrom to produce alternating square-wave currents of controllably variable phasing relative to said reference phase, phase-sensitive means conductively responsive to said composite signal and said square-wave currents to derive unidirectional currents representative of the instantaneous phase differences between said composite signal and said square-wave currents, circuit means connected to apply said composite signal to said phase-sensitive means, coupling means connected to apply said square-wave currents to said phase-sensitive means, and output terminal means for supplying said unidirectional currents to an indicator, wherein said generating means includes a saturable reactor circuit formed with a pair of reactor cores each having a control winding and a load winding thereon, a choke coil serially interconnecting the control windings of said cores in series-opposing relation for energization from a direct current power supply whereby said saturable reactor circuit operates under forced magnetization conditions to produce alternating square-wave currents in said load windings, the load windings of said cores being connected in series-aiding relation, phase-control means interconnecting said load windings with said energizing terminal means for controllably varying the phasing of said alternating square-wave currents relative to said reference phase; wherein said phase-sensitive means comprises a silicon-diode chopper-circuit network; wherein said coupling means comprises a transformer having a primary winding connected in series with said load windings to receive the square-wave currents produced by said saturable reactor circuit and secondary windings connected to said chopper-circuit network to apply thereto the square-wave currents induced in said secondary windings by said primary winding.

25. The test device of claim 24 for determining the waveform of an alternating current sample of the composite signal produced by an alternating current circuit serving as the electrical sample: wherein said chopper-circuit network comprises a half-wave bridge-type chopper circuit including a silicon-junction-diode in at least two legs of the bridge, the diodes being so phased as to conduct only on alternate half-cycles of predetermined polarity of said alternating square-wave currents; wherein said circuit means comprises an air-core transformer intercoupling the half-wave chopper circuit with the alternating current circuit serving as the sample, the chopper circuit being effective upon conduction during the said predetermined polarity half-cycles to produce unidirectional currents of magnitudes proportional to the phase differences between said square-ware currents and said alternating current sample; and wheein said phase-control means comprises a selectively adjustable phase-shifter for incrementally varying the phasing of said square-wave currents through 180 degrees relative to said reference phase whereby a composite of the unidirectional currents produced by said chopper circuit is a representation of the waveform of said alternating current sample.

26. The test device of claim 24 for determining the waveform of a symmetrically sinusoidal voltage sample of the composite signal produced by an alternating current circuit serving as the electrical sample: wherein said chopper circuit network comprises a full-wave ring-modulator circuit including a silicon-junction-diode in each leg of the ring, said diodes being so phased as to present a pair of conductive paths of opposing polarity such as to pass alternate half-cycles of one polarity of said square-wave currents through one conductive path and the half-cycles of opposite polarity through the other conductive path, a respective load element for each of said conductive paths; wherein said circuit means comprises a capacitor interconnecting said ring-modulator so as to receive said voltage sample, said capacitor forming a differentiating circuit with the resistance presented by said ring-modulator, the one conductive path of ring-modulator being effective during its conductive half-cycles and in response to said voltage sample to develop across its respective load element unidirectional currents proportional to the phase displacements between said voltage sample and half-cycles passed by said one path, the other conductive path being effective during its conductive half-cycles and in response to said voltage sample to develop across its respective load element unidirectional current proportional to the phase displacements between said voltage sample and the half-cycles passed by said other path; and wherein said phase-control means comprises a selectively adjustable phase-shifter for incrementally varying the phasing of said square-wave currents through 180 degrees relative to said reference phase whereby a series of unidirectional currents are developed across each of said load elements, the composite of the two series of unidirectional currents being representative of the waveform of said voltage sample.

27. The test device of claim 24, wherein said composite signal includes a first alternating current applied as a magnetizing current to a magnetic core material serving as the electrical sample and a second alternating current inductively derived from the magnetization of said core material, said first and second currents being in constant phase relationship with respect to said reference phase; wherein said chopper-circuit network includes a first silicon-diode chopper circuit connected to receive said first current and said square-wave currents and operable to derive therefrom unidirectional currents representative of the instantaneous phase differences therebetween, and a second silicon-diode chopper circuit connected to receive said second current and said square-wave currents and operable to derive therefrom unidirectional currents representative of the instantaneous phase differences therebetween; wherein the secondary windings of said transformer consist of a pair of secondary windings each connected to a respective one of said chopper circuits to apply the square-wave currents thereto; and wherein said output terminals means comprise a pair of output terminals for said first chopper circuit and a pair of output terminals for said second chopper circuit, a composite of the unidirectional currents appearing across the output terminals of said first and second chopper circuits being representative of the dynamic hysteresis loop of the magnetic core material serving as the electrical sample.

28. The test device of claim 27, wherein said first and second chopper circuits each are of the half-wave bridge-type including a silicon-junction-diode in at least two legs of the bridge; and wherein said phase-control comprises a selectively adjustable phase-shifter for incrementally varying the phasing of said square-wave currents relative to said reference phase.

29. The test device of claim 27, wherein said first and second chopper circuits each are of the full-wave ring-modulator type including a silicon-junction-diode in each leg thereof.

30. The test device of claim 29, wherein said phase-control means is a dual mode phase-shifter selectively operable for incremental adjustment in one mode and continuously variable by a motor in the other mode.

31. The test device of claim 29, wherein said first and second alternating currents are of the same frequency; and wherein said phase control means is an oscillator the frequency of which differs slightly from the first mentioned frequency.

32. A test device for determining an electrical characteristic of an electrical sample energized from an alternating current source of operating potential to produce a periodically varying composite signal of symmetrical waveform and of fixed phase relative to a reference phase, said test device including, in combination, energizing terminal means for connection to said source, variable-phase square-wave generating means adapted to be energized from said source through said terminal means and operable upon energization therefrom to produce alternating square-wave currents of controllably variable phasing relative to said reference phase, phase-sensitive means conductively responsive to said composite signal and said square-wave currents to derive unidirectional currents representative of the instantaneous phase differences between said composite signal and said square-wave currents, circuit means connected to apply said composite signal to said phase-sensitive means, coupling means connected to apply said square-wave currents to said phase-sensitive means, and output terminal means for supplying said unidirectional currents to an indicator, wherein said phase-sensitive means comprises a pair of similar silicon-diode chopper circuits and wherein said generating means comprises a ferroresonant magnetic switch circuit formed with a pair of interconected primary windings and a pair of secondary windings, said coupling means connecting each of said secondary windings in conductive circuit relationship with a respective one of said chopper circuits, and phase-control means having the stator thereof connected to said energizing terminal means and the rotor thereof connected to said primary windings.

33. The test device of claim 32, wherein each of said chopper circuits is of the half-wave bridge-type.

34. The test device of claim 32, wherein each of said chopper circuits is of the full-wave ring-modulator type.

35. In combination for determining the B-H characteristic of a magnetic core, first and second phase-sensitive channels, circuit means for connection to a source of alternating current, first winding means energized through said circuit means and associated with the magnetic core to apply a magnetizing alternating current thereto from said source, second winding means on said core for inductively deriving a second alternating current from the magnetization of the core and of the same frequency as said magnetizing current, said second winding means being connected in circuit relation with said first channel to supply said second alternating current thereto, coupling means for applying said magnetizing current to said second channel, a square-wave generator including saturable reactor means having windings so arranged thereon as to be operable upon energization to produce a phase-variable alternating square-wave current, phase-control means interconnecting said generator with said circuit means for energizing said generator from said source through said phase-control means, said phase-control means being selectively operable to vary the phase of said square-wave current, translating means for supplying said phase-variable square-wave current to said first and second channels, said first and second channels conductively combining said square-wave current with said second alternating current and said magnetizing current respectively to each derive unidirectional currents representative of the phase differences between their respectively combined currents, and circuit connections respective to each channel for supplying the derived unidirectional currents to indicating means.

36. The combination of claim 35, wherein each of said channels is a half-wave transistor demodulator including PNP type transistors; wherein said saturable reactor means is an arrangement operating under forced magnetization conditions; wherein said coupling means is an air-core transformer having its primary connected in conductive circuit relation with said first winding and having its secondary connected in conductive circuit relation with said second channel; and wherein said phase-control means is a dual mode phase-shifter operable to be incrementally varied in one mode and continuously varied in the other mode whereby the phasing of the square-wave current is varied.

37. The combination of claim 35, wherein each of said channels is a half-wave silicon-diode chopper circuit; wherein said saturable reactor means is an arrangement operating under forced magnetization conditions; and wherein said phase-control means is an adjustable phase-shifter.

38. The combination of claim 35, wherein each of said channels is a full-wave ring-modulator including silicon-diodes; wherein said saturable reactor means is an arrangement operating under forced magnetization conditions; and wherein said phase-control means is a dual mode phase-shifter operable to be incrementally varied in one mode and continuously varied in the other mode whereby the phasing of the square-wave current is varied.

39. The combination of claim 35, wherein each of said channels is a full-wave ring-modulator including silicon-diodes; wherein said saturable reactor means is an arrangement operating under forced magnetization conditions; and wherein said phase-control means is an oscillator operating at a frequency slightly different from that of said second and magnetizing alternating currents.

40. The combination of claim 35, wherein each of said channels is a half-wave silicon-diode chopper circuit; wherein said saturable reactor means is a ferroresonant magnetic circuit including a saturable reactor core having a pair of interconnected primary windings and a pair of secondary windings each connected in conductive circuit relation with a respective one of said chopper circuits; and wherein said phase-control means is a synchro control transformer having the stator thereof connected to said circuit means and the rotor thereof connected to the pair of primary windings of said saturable reactor core.

41. The combination of claim 35, wherein each of said channels is a full-wave ring-modulator including silicon-diodes; wherein said saturable reactor means is a ferro-resonant magnetic circuit including a saturable reactor core having a pair of interconnected primary windings and a pair of secondary windings each connected in conductive circuit relation with a respective one of said ring-modulators; and wherein said phase-control means is a synchro control transformer having the stator thereof connected to said circuit means and the rotor thereof connected to the pair of windings of said saturable reactor core.

42. In combination for determining the B-H loop of a magnetic core, a first phase sensitive channel, a second phase sensitive channel, each of said channels including a drift-compensated phase-sensitive bridge circuit adapted to receive a reference alternating current signal across one pair of terminals and a test signal across another pair of terminals and including a silicon-diode in at least two legs of the bridge, a potentiometer serially interconnecting the said diodes, and a respective resistor in series with each of said diodes, said resistors being connected to a common junction, said junction and the tap on the potentiometer forming said another pair of terminals, the diode electrodes adjacent said resistors forming said one pair of electrodes, circuit means including a first winding on the core for applying a magnetizing alternating current to the core, a second winding on the core for inductively deriving a second alternating current from the magnetization of the core, said second winding being in conductive circuit relation with said another pair of terminals of said first channel, coupling means in conductive circuit relation with said circuit means and said another pair of terminals of said second channel to supply thereto said magnetizing alternating current, a square-wave generator producing an alternating square-wave current, phase-control means operatively associated with said generator for controllably varying the phase of said square-wave current, translating means for supplying said phase-variable square-wave current to said one pair of terminals of each of said first and second channels, the diodes of said channels being so phased that said first channel passes half-cycles of one polarity of said square-wave current while said second channel passes half-cycles of opposite polarity of said square-wave current, and output terminal means in each of said channels and connected in series circuit relationship with said another pair of terminals of its respective channel, said output terminal means being connectable to indicating means which provide data compositely representative of the B-H loop of the magnetic core.

43. In combination, a first drift-compensated phase-sensitive bridge circuit adapted to receive a reference alternating current signal across one pair of terminals and a test signal across another pair of terminals and including a silicon-diode in at least two legs of the bridge, a potentiometer serially interconnecting the said diodes, and a respective resistor in series with each of said diodes, said resistors being connected to a common junction, said junction and the tap on the potentiometer forming said another pair of terminals, the diode electrodes adjacent said resistors forming said one pair of electrodes; a second drift-compensated phase-sensitive bridge circuit adapted to receive a reference alternating current signal across one pair of terminals and a test signal across another pair of terminals and including a silicon-diode in at least two legs of the bridge, a potentiometer serially interconnecting the said diodes, and a respective resistor in series with each of said diodes, said resistors being connected to a common junction, said junction and the tap on the potentiometer forming said another pair of terminals, the diode electrodes adjacent said resistors forming said one pair of electrodes; and a pair of input terminals connected in common with said another pair of terminals of each bridge circuit, the diodes of said bridge circuits being so phased that said first bridge circuit passes a reference current of one polarity while said second bridge circuit passes a reference current of opposite polarity to thereby form a full-wave bridge arrangement.

44. In combination for determining the B-H loop of a magnetic core, a first phase-sensitive channel including a full-wave bridge arrangement as defined in claim 43, a second phase-sensitive channel including a full-wave bridge arrangement as defined in claim 43, circuit means including a first winding on the core for applying a magnetizing alternating current to the core, a second winding on the core for inductively deriving a second alternating current from the magnetization of the core, said second winding being in conductive circuit relation with said input terminals of said first channel, coupling means in conductive circuit relation with said circuit means and said input terminals of said second channel to supply thereto said magnetizing alternating current, a square-wave generator producing an alternating square-wave current, phase-control means operatively associated with said generator for controllably varying the phase of said square-wave current, translating means for supplying said phase-variable square-wave current to said one pair of terminals of each of said bridge circuits, and output terminal means in each of said channels and connected in series circuit relationship with said input terminals of its respective full-wave arrangement, said output terminal means being connectable to indicating means which provide data compositely representative of the B-H loop of the magnetic core.

References Cited in the file of this patent

UNITED STATES PATENTS

| | | |
|---|---|---|
| 1,929,216 | Pfannenmuller | Oct. 3, 1933 |
| 2,283,742 | Leonard | May 19, 1942 |
| 2,432,214 | Sontheimer | Dec. 9, 1947 |
| 2,432,778 | Luck | Dec. 16, 1947 |
| 2,470,412 | Piety | May 17, 1949 |
| 2,562,912 | Hawley | Aug. 7, 1951 |
| 2,568,250 | O'Brien | Sept. 18, 1951 |
| 2,595,675 | Jaynes | May 6, 1952 |
| 2,616,058 | Wagner | Oct. 28, 1952 |
| 2,781,489 | Petrides | Feb. 12, 1957 |
| 2,794,928 | Frank | June 4, 1957 |
| 2,805,390 | Patrick et al. | Sept. 3, 1957 |
| 2,806,992 | Foerster | Sept. 17, 1957 |
| 2,820,143 | D'Nelly | Jan. 14, 1958 |
| 2,905,896 | Kamp | Sept. 22, 1959 |